(12) United States Patent
Saiki et al.

(10) Patent No.: US 12,271,101 B2
(45) Date of Patent: Apr. 8, 2025

(54) IMAGING APPARATUS SYSTEM

(71) Applicant: Panasonic Intellectual Property Management Co., Ltd., Osaka (JP)

(72) Inventors: Jun Saiki, Hyogo (JP); Takuo Taniguchi, Osaka (JP); Yoshiaki Kudo, Osaka (JP); Rintaro Wada, Osaka (JP); Ryousuke Tamaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 93 days.

(21) Appl. No.: 18/242,497

(22) Filed: Sep. 5, 2023

(65) Prior Publication Data
US 2024/0077790 A1    Mar. 7, 2024

(30) Foreign Application Priority Data

Sep. 7, 2022   (JP) .................. 2022-142478

(51) Int. Cl.
  *G03B 17/55*   (2021.01)
  *G03B 17/12*   (2021.01)
(52) U.S. Cl.
  CPC ............ *G03B 17/55* (2013.01); *G03B 17/12* (2013.01); *G03B 2217/002* (2013.01)

(58) Field of Classification Search
  CPC ................. G03B 17/55; H04N 23/51
  See application file for complete search history.

(56) References Cited

U.S. PATENT DOCUMENTS

| | | | |
|---|---|---|---|
| 11,029,582 B2* | 6/2021 | Nakamura | G03B 17/55 |
| 11,438,489 B1* | 9/2022 | Saiki | G03B 17/55 |
| 11,601,573 B2* | 3/2023 | Tamura | H04N 23/51 |
| 11,647,267 B2* | 5/2023 | Gunji | G03B 17/563 |
| | | | 396/535 |
| 2011/0164171 A1 | 7/2011 | Yasuda et al. | |
| 2023/0035644 A1* | 2/2023 | Kuroki | H05K 7/2039 |

FOREIGN PATENT DOCUMENTS

| | | | |
|---|---|---|---|
| JP | 2003-207829 A | 7/2003 | |
| JP | 2011-095777 A | 5/2011 | |
| JP | 2020010237 A * | 1/2020 | ............ H02M 3/156 |

\* cited by examiner

*Primary Examiner* — Leon W Rhodes, Jr.
(74) *Attorney, Agent, or Firm* — Renner, Otto, Boisselle & Sklar, LLP

(57) ABSTRACT

An imaging apparatus system includes a first imaging apparatus, and a second imaging apparatus. The first imaging apparatus includes a first top casing including a casing top surface, and a common rear casing including a casing rear surface. The second imaging apparatus includes a second top casing including a casing top surface, and the common rear casing. The first top casing has a shape in which a vent hole is formed in the second top casing.

8 Claims, 29 Drawing Sheets

IMAGING APPARATUS SYSTEM

BACKGROUND OF THE INVENTION

Field of the Invention

The present disclosure relates to an imaging apparatus system including a plurality of imaging apparatuses of different types.

Description of the Related Art

In general, the design of a camera is roughly divided into two types of a single-lens reflex type and a range finder type regardless of the presence or absence of a mirror box. For example, JP 2011-95777 A discloses an imaging apparatus having what is called a single-lens reflex type design in which a lens mount is provided on a front surface of a casing, and a grip portion is integrally (undetachably) provided in a casing portion on the left side of the lens mount in a front view. In addition, in the case of an imaging apparatus having a digital single-lens reflex type design, an image sensor is provided inside the casing, and a monitor is provided on a rear surface of the casing.

SUMMARY OF THE INVENTION

By the way, the imaging apparatus provided with the single-lens reflex type design has substantially common designability with regard to appearance even if the types are different. Nevertheless, there has been a waste of overlapping development periods and development costs such as designing and manufacturing similar components and parts. Therefore, in producing a plurality of different types of imaging apparatuses, there has been a case where designing thereof cannot be performed rationally and the manufacturing cost is increased.

Therefore, an object of the present disclosure is, in producing a plurality of imaging apparatuses of different types, to streamline the design thereof and to suppress the manufacturing cost low.

In order to solve the above problem, according to an aspect of the present disclosure, provided is an imaging apparatus system including: a first imaging apparatus; and a second imaging apparatus. The first imaging apparatus includes: a first top casing including a casing top surface, and a common rear casing including a casing rear surface. The second imaging apparatus includes: a second top casing including a casing top surface, and the common rear casing. The first top casing has a shape in which a vent hole is formed in the second top casing.

According to the present disclosure, in producing a plurality of imaging apparatuses of different types, the design thereof can be streamlined, and the manufacturing cost can be suppressed low.

DESCRIPTION OF THE PREFERRED EMBODIMENTS

Figure 1:
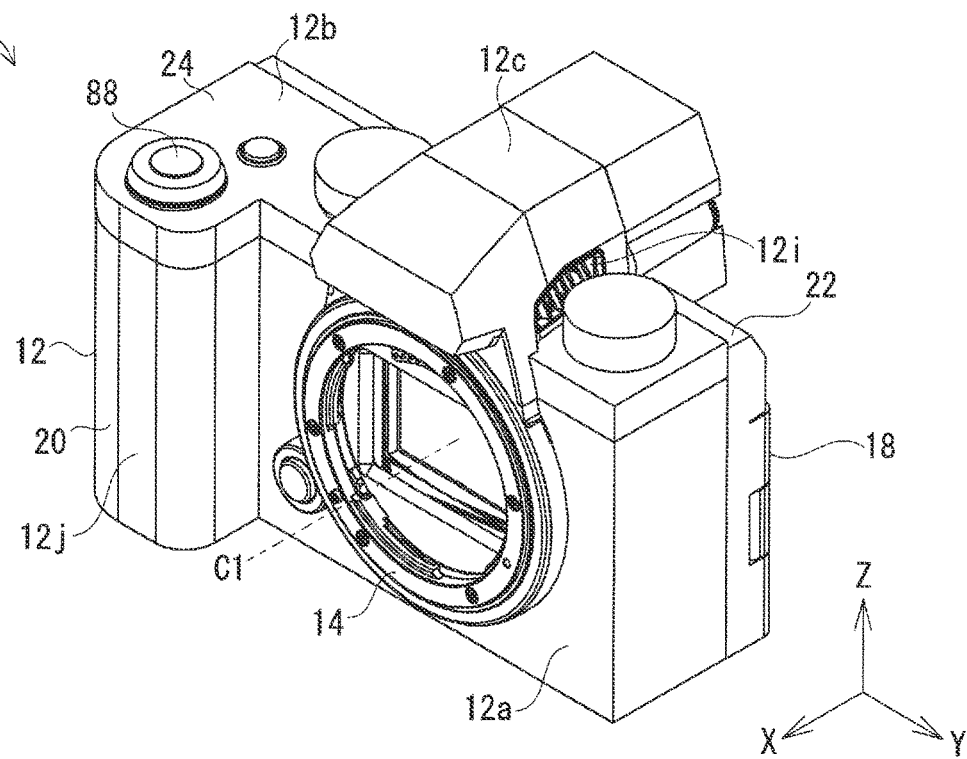
FIG. 1 is a right front perspective view of a first imaging apparatus in an imaging apparatus system according to an embodiment of the present disclosure.
Figure 2:
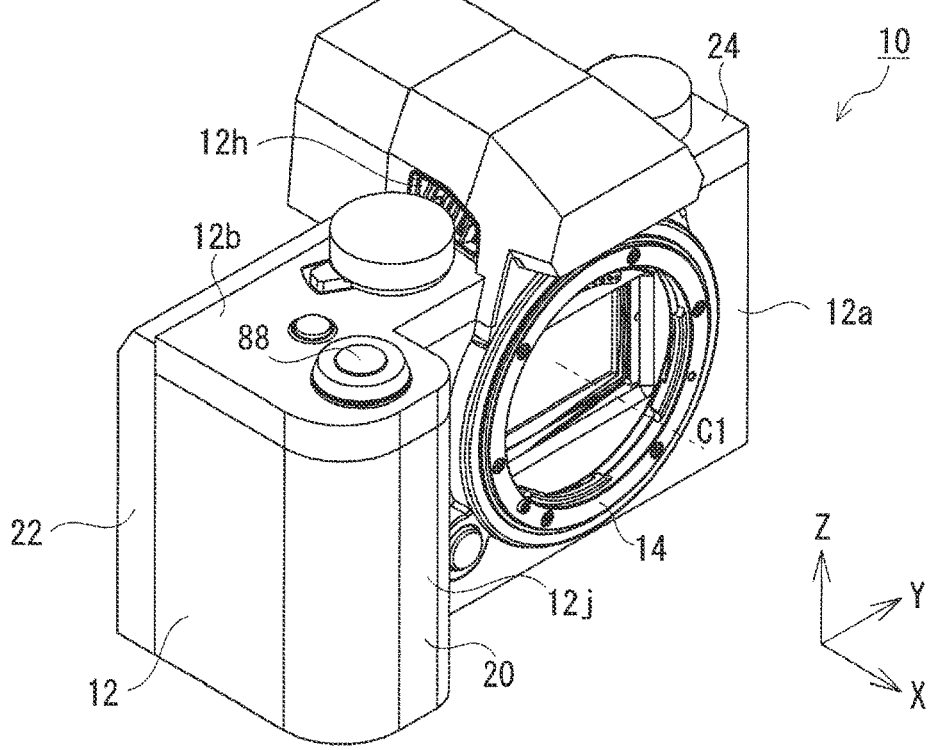
FIG. 2 is a left front perspective view of the first imaging apparatus according to an embodiment of the present disclosure.

Hereinafter, embodiments will be described in detail with reference to the drawings as appropriate. However, a detailed description more than necessary may be omitted. For example, a detailed description of already well-known matters and a redundant description of substantially the same configuration may be omitted. This is to avoid the following description from becoming unnecessarily redundant and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

Hereinafter, an imaging apparatus system according to embodiments of the present disclosure will be described with reference to the drawings.

An imaging apparatus system according to an embodiment of the present disclosure includes a first imaging apparatus and a second imaging apparatus of different types. Therefore, first, each of the first and second imaging apparatuses will be described.

FIGS. 1 to 5 are a right front perspective view, a left front perspective view, a rear perspective view, a front view, and a bottom view of a first imaging apparatus in an imaging apparatus system according to an embodiment of the present disclosure. It should be noted that a part of the first imaging apparatus is schematically illustrated.

Here, the X-Y-Z orthogonal coordinate system shown in the drawings is for facilitating understanding of embodiments of the present disclosure, and does not limit the embodiments of the present disclosure. The X-axis direction is a front-rear direction of the imaging apparatus, the Y-axis direction is a left-right direction, and the Z-axis direction is a height direction. In addition, the side where the subject is present at the time of photographing is defined as the front side of the imaging apparatus.

As shown in FIGS. 1 to 5, the first imaging apparatus 10 according to the present embodiment has a design similar to that of a single-lens reflex type camera including a pentamirror. The first imaging apparatus 10 includes a casing 12. The casing 12 is provided with a lens mount 14 (first lens mount) and an electronic viewfinder (EVF) 16 (first electronic viewfinder). Specifically, the lens mount 14 is provided on the front surface 12a of the casing 12. The electronic viewfinder 16 is provided in an upward protruding portion 12c protruding from a substantially central portion in the left-right direction of the top surface 12b of the casing 12. In addition, the electronic viewfinder 16 outputs an image through a finder window 12k provided on the rear surface of the upward protruding portion 12c. The lens mount 14 and the electronic viewfinder 16 are provided so as to intersect with a virtual plane (Z-X plane) extending in the height direction (Z-axis direction) including the optical axis C1 of the lens mount 14 (that is, the optical axis of the lens to be mounted on the lens mount 14). In addition, a female screw hole 12d (first female screw hole) for mounting the camera platform is provided in the bottom surface 12e of the casing 12 so as to intersect with the virtual plane.

Figure 3:
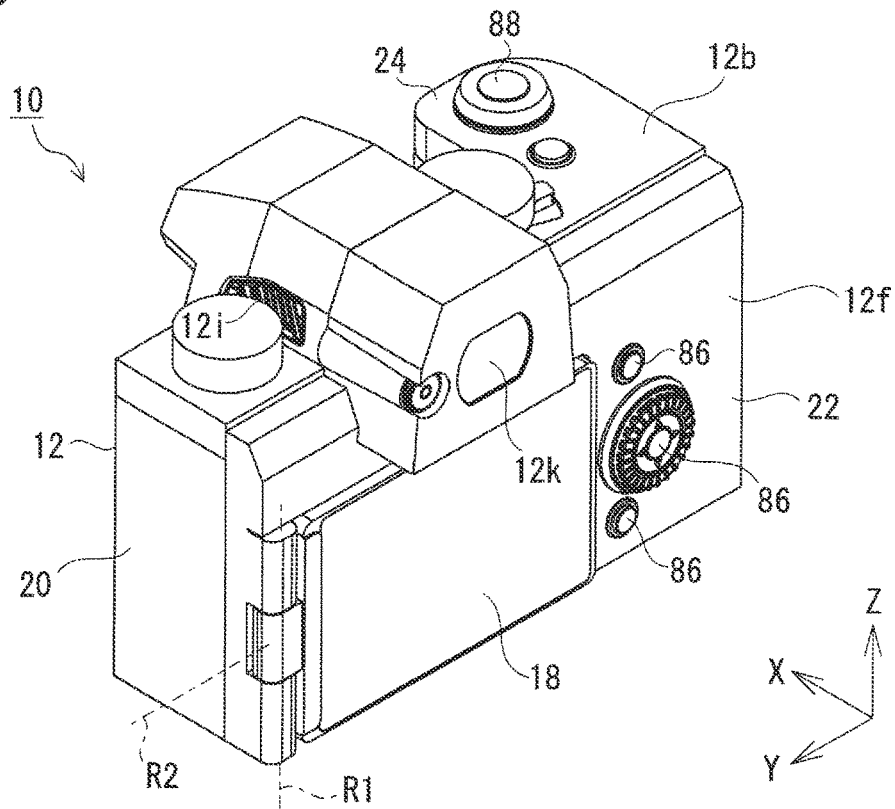
FIG. 3 is a rear perspective view of the first imaging apparatus according to an embodiment of the present disclosure.

In addition, in the case of the present embodiment, a vari-angle monitor 18 is provided on the rear surface 12f of the casing 12. As shown in FIG. 3, the vari-angle monitor 18 is provided in the casing 12 so as to be pivotable about a first rotation center line R1 extending in the height direction (Z-axis direction) and a second rotation center line R2 extending in a direction orthogonal to the first rotation center line R1.

Figure 6:
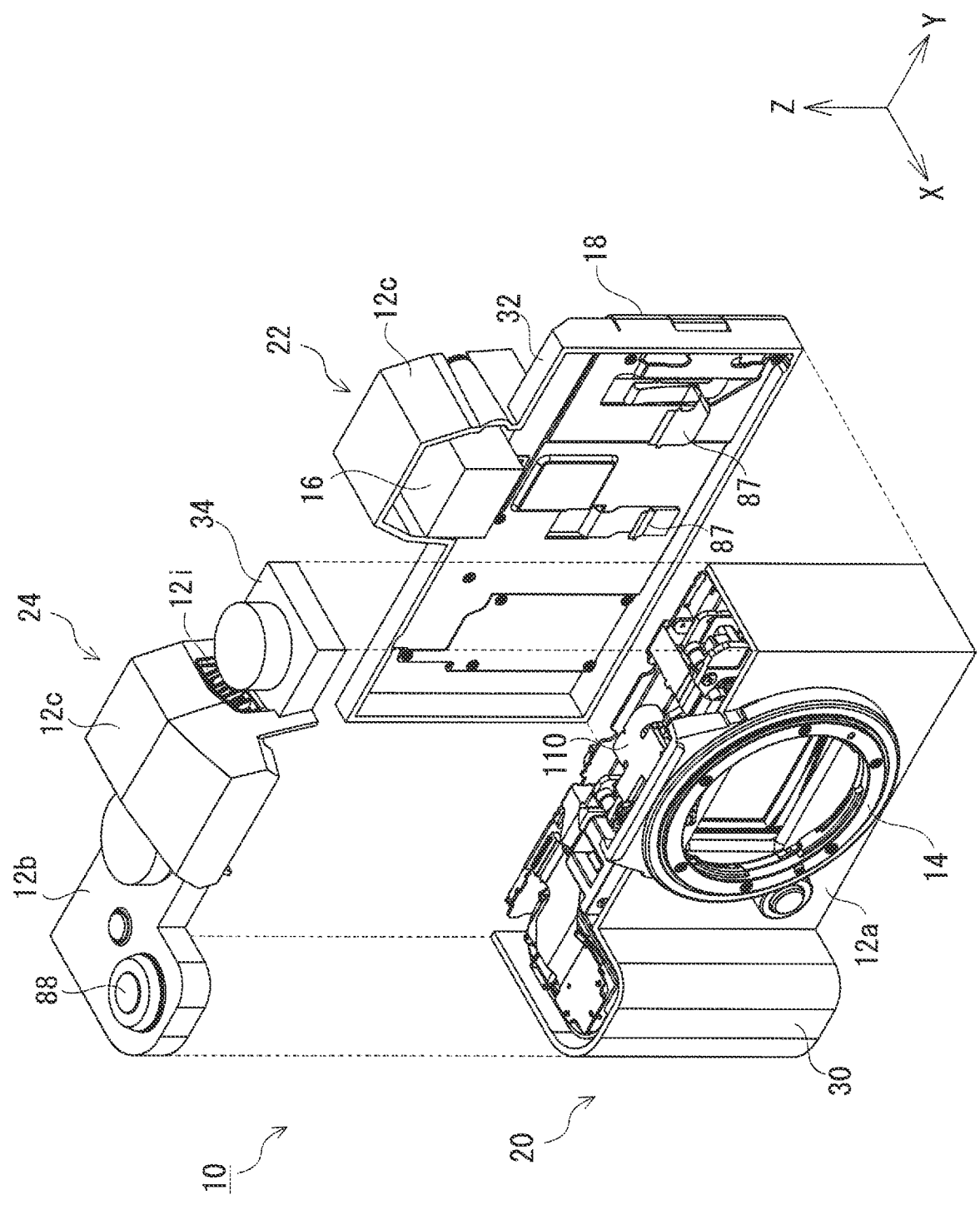
FIG. 6 is an exploded perspective view of the first imaging apparatus according to an embodiment of the present disclosure.

FIG. 6 is an exploded perspective view of the first imaging apparatus according to an embodiment of the present disclosure.

As shown in FIG. 6, the first imaging apparatus 10 according to the present embodiment includes a front unit 20, a rear unit 22, and a top unit 24.

The front unit 20 constitutes a part of the casing 12 and includes a front casing 30 (first front casing) including at least a front surface 12a of the casing 12. It should be noted that the front casing 30 may include the entire front surface 12a or a part of the front surface 12a. It should be noted that a rubber sheet for preventing slipping may be attached to a part of the outer surface of the front casing 30.

The rear unit 22 constitutes a part of the casing 12 and includes a rear casing 32 including at least a rear surface 12f of the casing 12. The rear casing 32 includes a rear side portion of the upward protruding portion 12c. It should be noted that the rear casing 32 may include the entire rear surface 121 or a part of the rear surface 12f. It should be noted that a rubber sheet for preventing sopping may be attached to a part of the outer surface of the rear casing 32.

The top unit 24 constitutes a part of the casing 12 and includes a top casing 34 (first top casing) including at least a top surface 12b of the casing 12. The top casing 34 includes a front side portion of the upward protruding portion 12c. It should be noted that the top casing 34 may include the entire top surface 12b or may include a part of the top surface 12b.

The casing 12 of the first imaging apparatus 10 is formed by fixing the front casing 30, the rear casing 32, and the top casing 34 to each other through, for example, screws.

Figure 7:
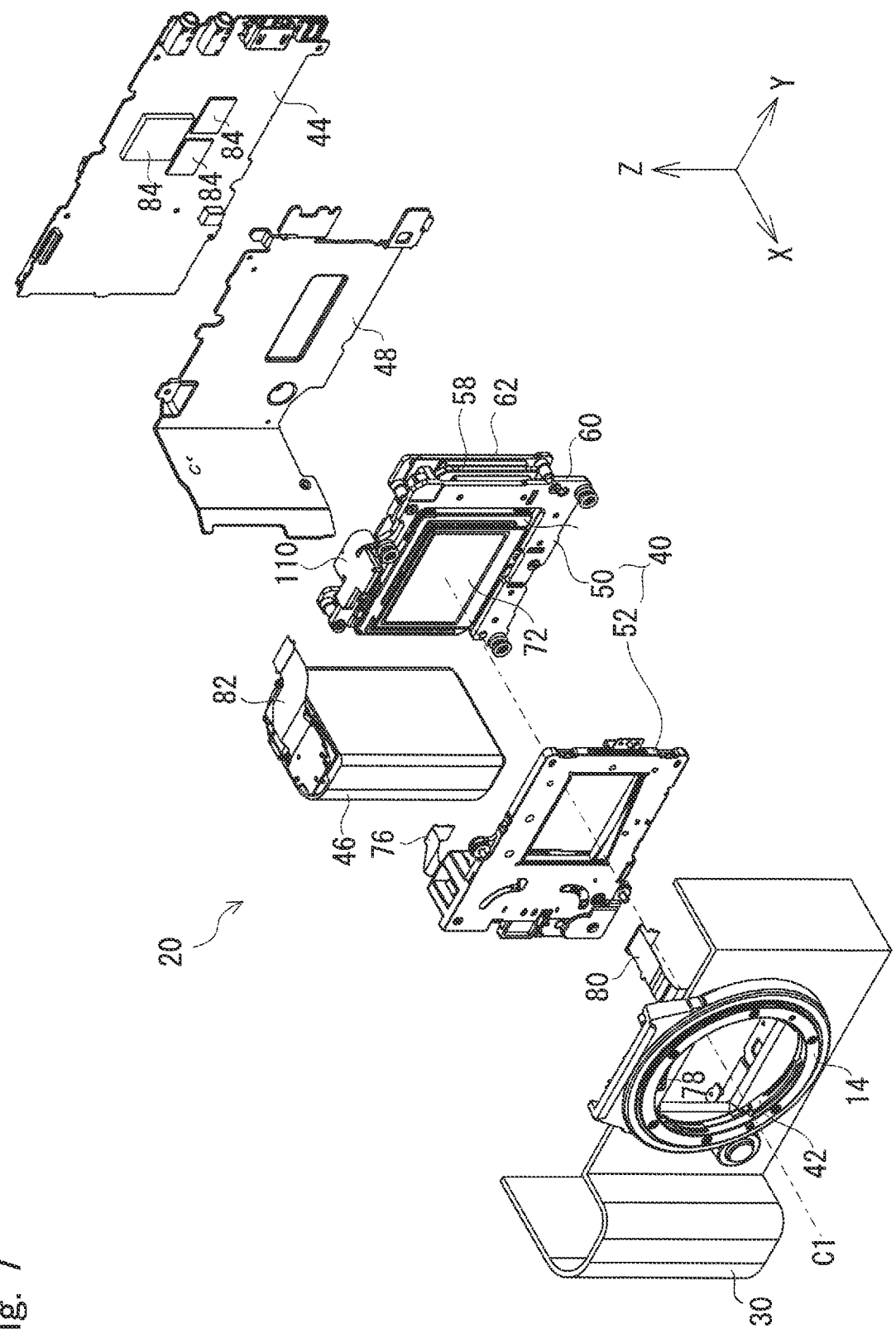
FIG. 7 is a front exploded perspective view of a front unit in the first imaging apparatus according to an embodiment of the present disclosure.
Figure 8:
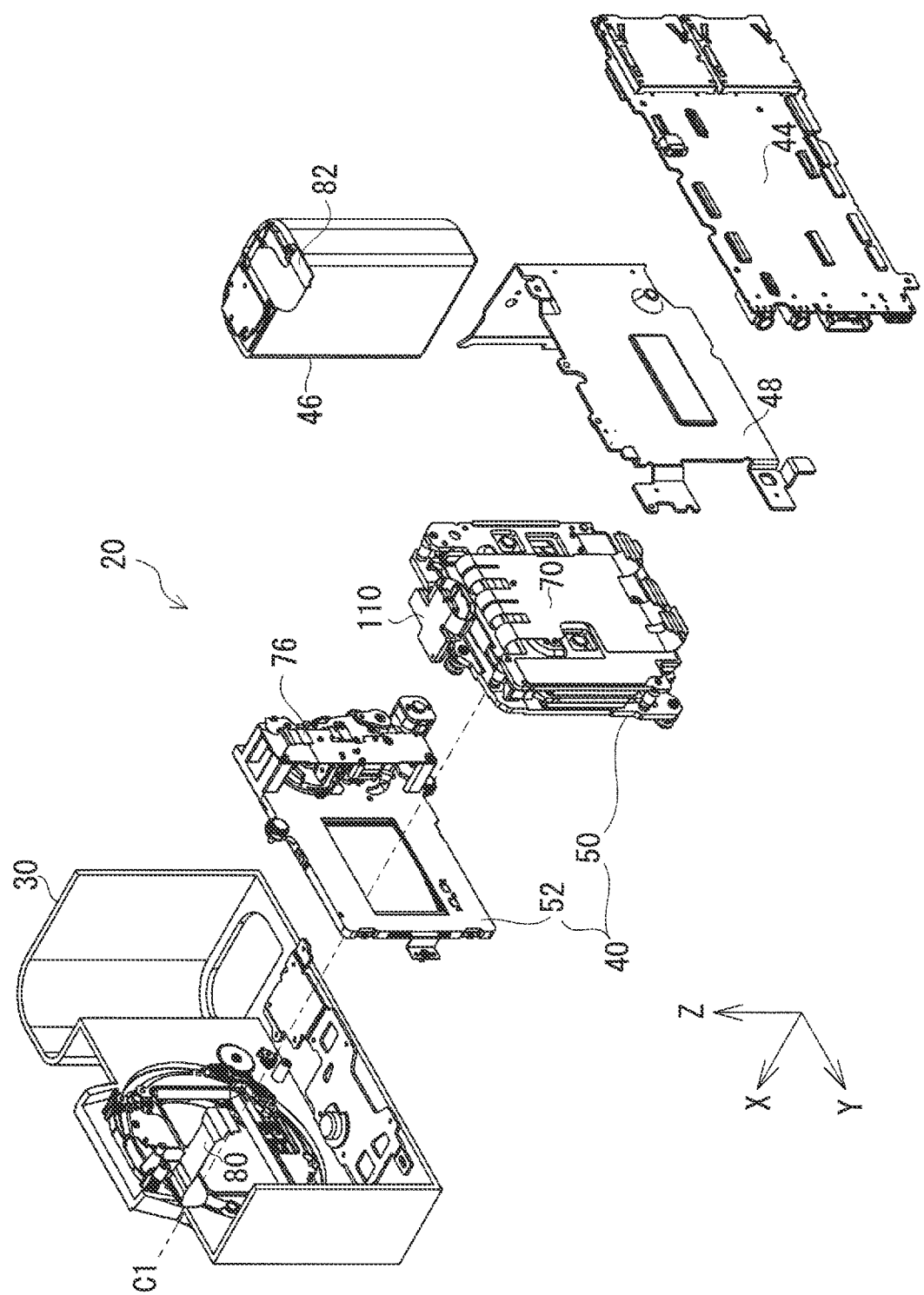
FIG. 8 is a rear exploded perspective view of the front unit in the first imaging apparatus according to an embodiment of the present disclosure.

FIGS. 7 and 8 are a front exploded perspective view and a rear exploded perspective view of the front unit in the first imaging apparatus according to an embodiment of the present disclosure.

As shown in FIGS. 7 and 8, in addition to the front casing 30, the front unit 20 includes an imaging module 40, a lens mount module 42, a main circuit board 44 (first circuit board), a battery 46, and a heat transfer plate 48. In addition, the imaging module 40 includes a sensor module 50 and a shutter module 52.

Figure 9:
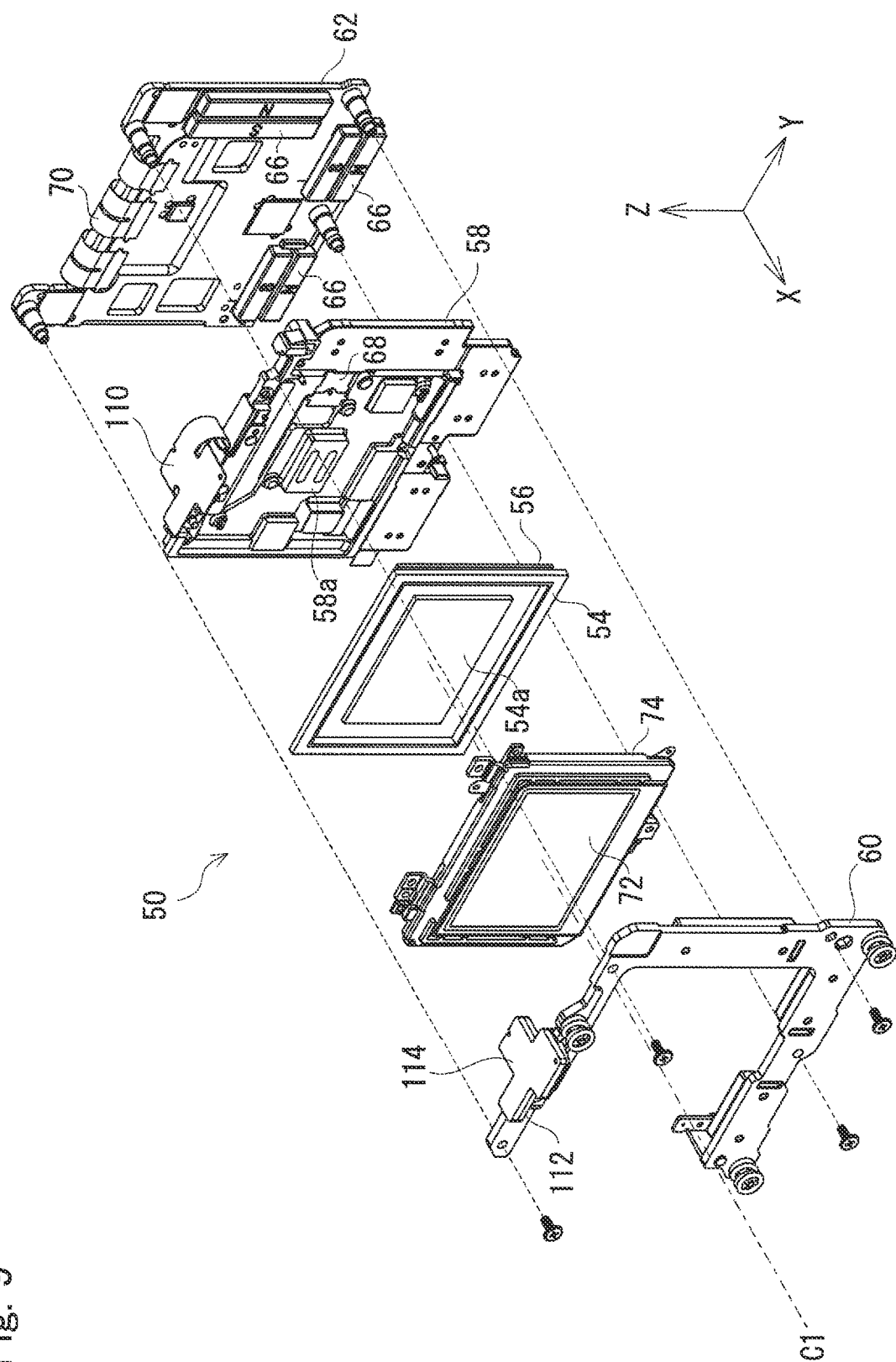
FIG. 9 is a front exploded perspective view of a sensor module in the first imaging apparatus according to an embodiment of the present disclosure.
Figure 10:
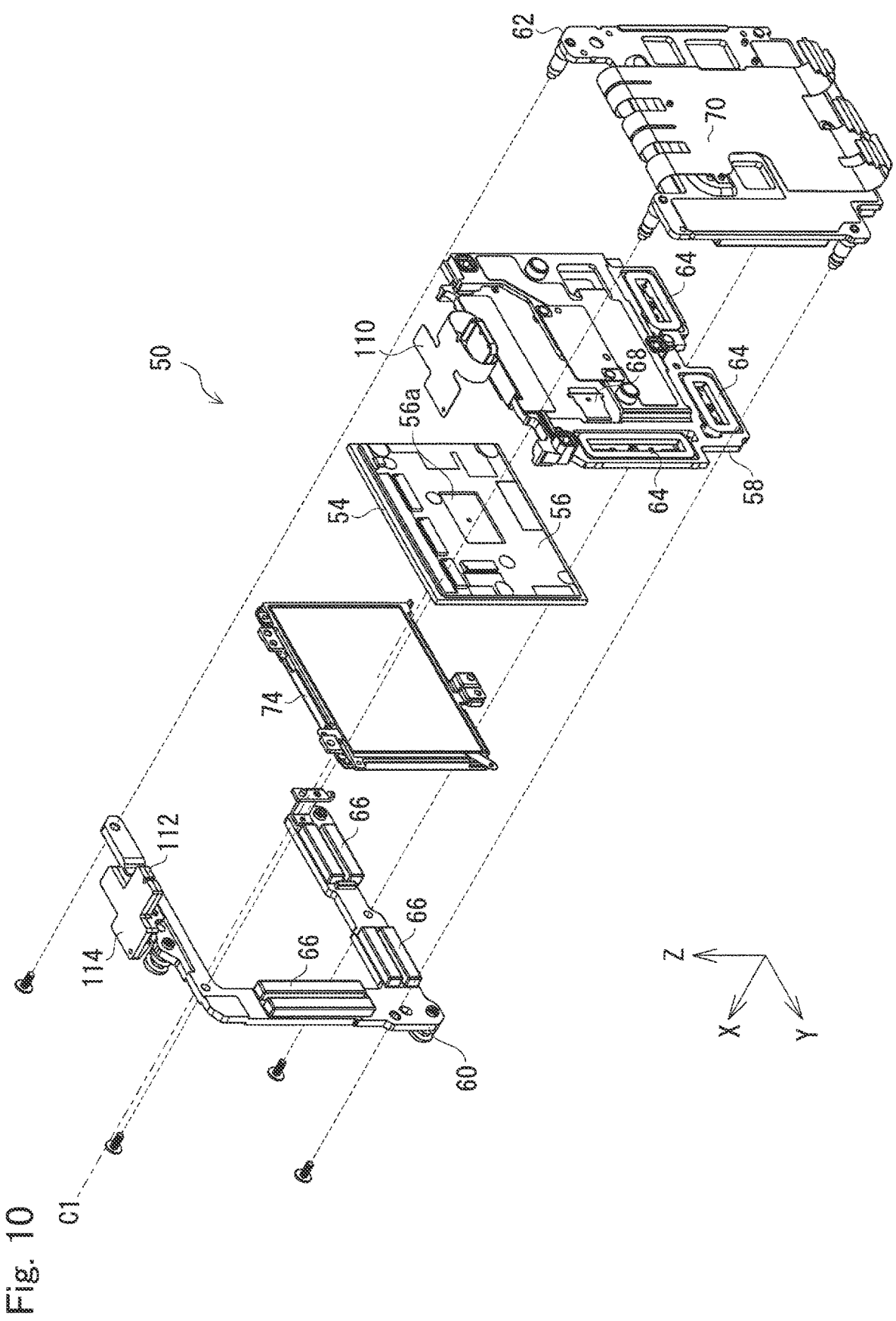
FIG. 10 is a rear exploded perspective view of the sensor module in the first imaging apparatus according to an embodiment of the present disclosure.

FIGS. 9 and 10 are a front exploded perspective view and a rear exploded perspective view of the sensor module in the first imaging apparatus according to an embodiment of the present disclosure.

As shown in FIGS. 9 and 10, the sensor module 50 of the imaging module 40 includes an image sensor 54 (first image sensor). The image sensor 54 is a device that receives the image light transmitted through the lens mounted on the lens mount 14 by the light receiving surface 54a and converts the received image light into an electric signal. The image sensor 54 is mounted on the circuit board 56.

In addition, in the case of the present embodiment, the first imaging apparatus 10 is configured to be able to execute camera shake compensation. That is, the sensor module 50 is configured so that the image sensor 54 can be displaced in a direction orthogonal to the optical axis C1 so that image blurring does not occur due to vibration of the hand of the user holding the first imaging apparatus 10. Specifically, the sensor module 50 includes a movable frame 58 that supports the image sensor 54, and a front frame 60 and a rear frame 62 that movably support the movable frame 58 in the left-right direction (Y-axis direction) and the height direction (Z-axis direction). It should be noted that the sensor module 50 is fixed to the front casing 30 through the front frame 60.

The front frame 60 and the rear frame 62 are fixed to each other, and support the movable frame 58 so that the movable frame 58 is displaced therebetween, A plurality of coils 64 and a plurality of magnets 66 for displacing the movable frame 58 are provided in the movable frame 58, the front frame 60, and the rear frame 62. A coil 64 on the movable frame 58 is disposed between the magnet 66 on the front frame 60 and the magnet 66 on the rear frame 62. By a current flowing through the coil 64, the coil 64 is displaced in a magnetic field formed between the magnets 66. As a result, the movable frame 58 is displaced, and the image sensor 54 supported by the movable frame 58 through the circuit board 56 is displaced.

It should be noted that the coil 64 is electrically connected to the circuit board 56 through a flexible cable 68. The circuit board 56 is electrically connected to the main circuit board 44 through a flexible cable 70.

In addition, the movable frame 58 is provided with a filter module 74 including a plurality of optical filters such as a protective glass 72 and an infrared cut glass so as to be positioned in front of the image sensor 54.

Furthermore, the image sensor 54 is connected to (in contact with) the movable frame 58 in a heat-transferable manner. Specifically, the projecting portion 58a provided in the movable frame 58 comes into contact with the image sensor 54 through the through hole 56a formed in the circuit board 56, whereby the image sensor 54 and the movable frame 58 are connected in a heat-transferable manner. Accordingly, heat of the image sensor 54 that generates heat during imaging is absorbed by the movable frame 58. It should be noted that the movable frame 58 is made of a material having high thermal conductivity such as aluminum in order to absorb heat of the image sensor 54. In addition, the transfer of heat from the movable frame 58 will be described below.

As shown in FIGS. 7 and 8, the shutter module 52 of the imaging module 40 is disposed in front of the sensor module 50. The shutter module 52 includes a shutter for adjusting an exposure time. The shutter module 52 is electrically connected to the main circuit board 44 through a flexible cable 76.

The lens mount module 42 includes an electronic contact 78 for electrically connecting the lens mount 14 and a lens mounted on the lens mount 14. The electronic contact 78 is electrically connected to the main circuit board 44 through a flexible cable 80.

The main circuit board 44 is disposed behind the imaging module 40. The battery 46 is electrically connected to the main circuit board 44 through a flexible cable 82. The main circuit board 44 controls the image sensor 54 of the sensor module 50, the shutter of the shutter module 52, the lens mounted on the lens mount 14, and the like.

The heat transfer plate 48 is a member for cooling a plurality of IC chips 84 mainly mounted on the main circuit board 44, and is in contact with the IC chip 84 through, for example, a heat transfer sheet (not shown). That is, the heat transfer plate 48 and the IC chip 84 are connected in a heat-transferable manner. The IC chip 84 is, for example, an image processing chip that generates image data based on an electric signal from the image sensor 54, and a memory that stores image data and the like. Heat of the IC chip 84 that generates heat during operation is absorbed by the heat transfer plate 48. It should be noted that the heat transfer plate 48 is made of a material having high thermal conductivity such as aluminum in order to absorb heat of the IC chip 84. In addition, the transfer of heat from the heat transfer plate 48 will be described below.

As shown in FIGS. 3 and 6, the rear unit 22 includes an electronic viewfinder 16, a monitor 18, and a plurality of operation buttons 86 in addition to the rear casing 32, These are electrically connected to the main circuit board 44 through a flexible cable 87. Thereby, the electronic viewfinder 16 and the monitor 18 are controlled by the main circuit board 44.

Figure 11:
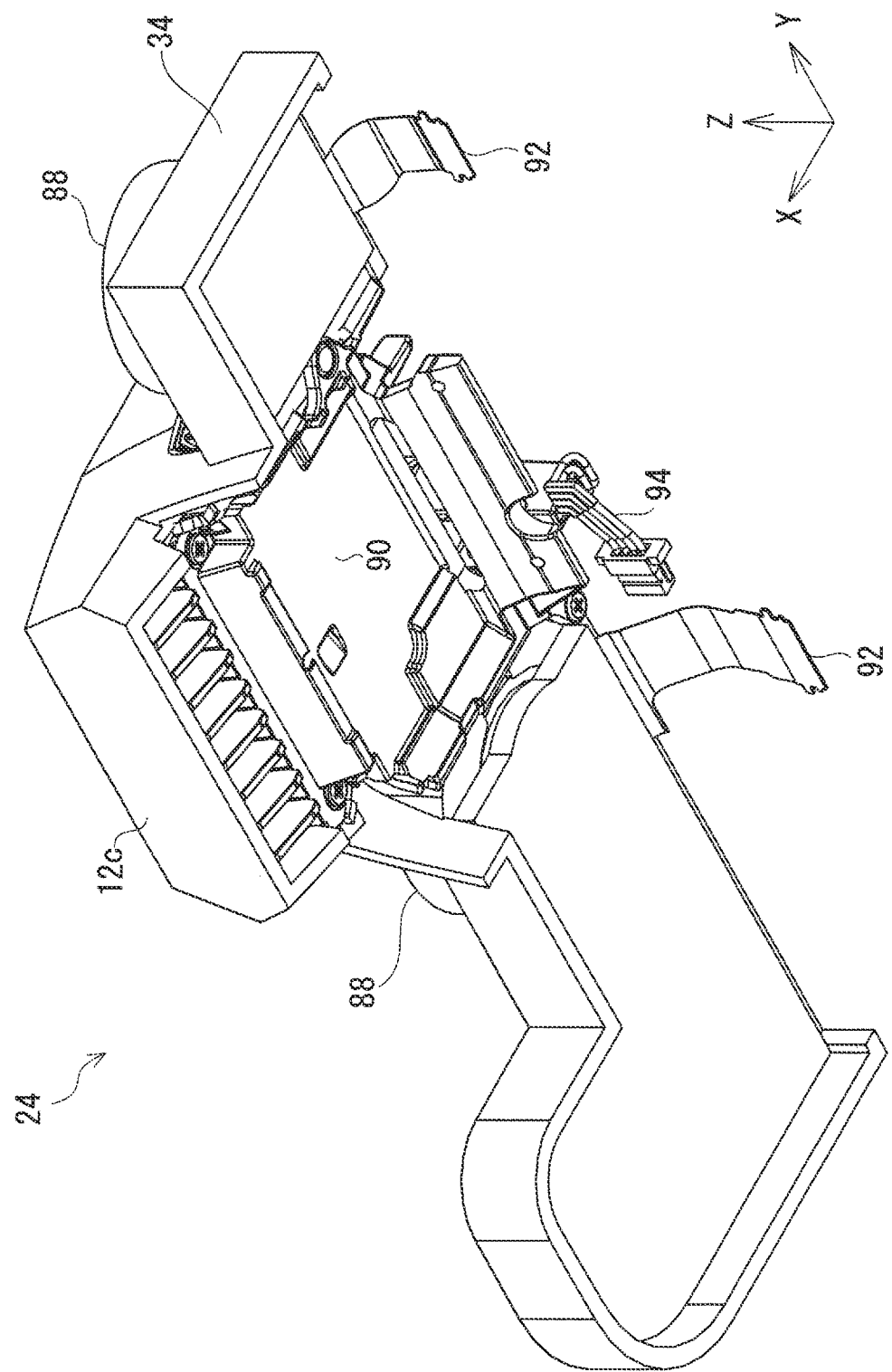
FIG. 11 is a lower perspective view of a top unit in the first imaging apparatus according to an embodiment of the present disclosure.

FIG. 11 is a lower perspective view of the top unit in the first imaging apparatus according to an embodiment of the present disclosure. In addition, FIG. 12 is an exploded perspective view of the top unit in the first imaging apparatus according to an embodiment of the present disclosure.

Figure 12:
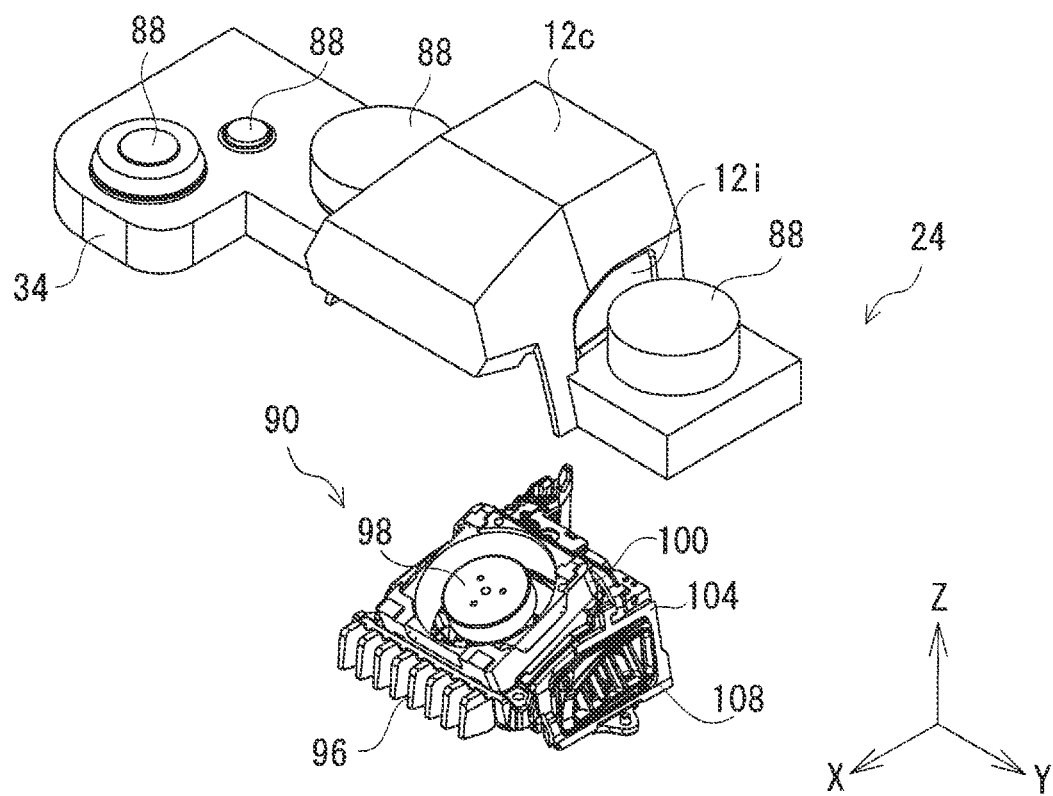
FIG. 12 is an exploded perspective view of the top unit in the first imaging apparatus according to an embodiment of the present disclosure.

As shown in FIGS. 11 and 12, the top unit 24 includes a plurality of operation buttons such as a shutter button 88, and a cooling module 90, in addition to the top casing 34. The operation button and the cooling module 90 are electrically connected to the main circuit board 44 through a flexible cable 92 and a lead wire 94.

The cooling module 90 is a module that forcibly cools the image sensor 54 on the sensor module 50 of the imaging module 40 and the IC chip 84 on the main circuit board 44, and is stored in the upward protruding portion 12c of the casing 12. It should be noted that the cooling module 90 is stored in the upward protruding portion 12c together with the electronic viewfinder 16, and is disposed in front of the electronic viewfinder 16.

Figure 13:
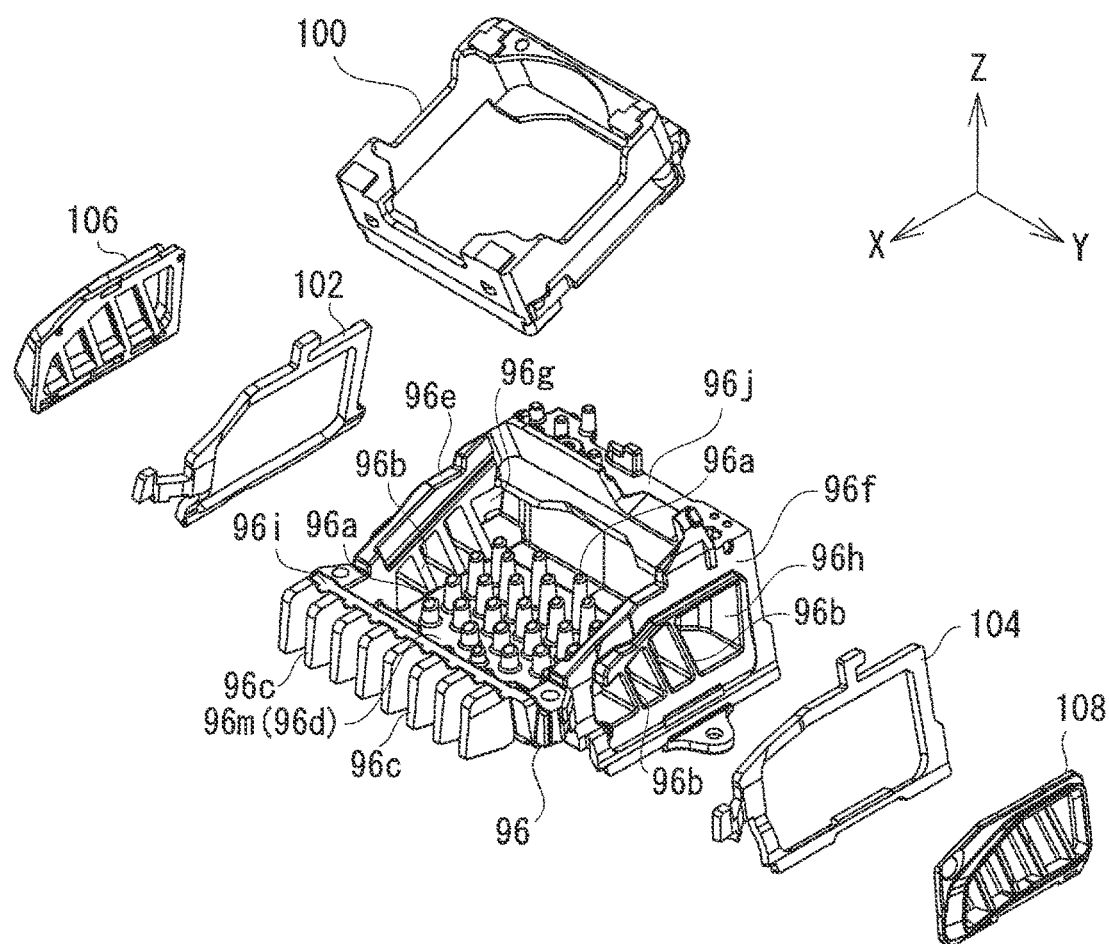
FIG. 13 is an exploded perspective view of a cooling module in the first imaging apparatus according to an embodiment of the present disclosure.
Figure 14:
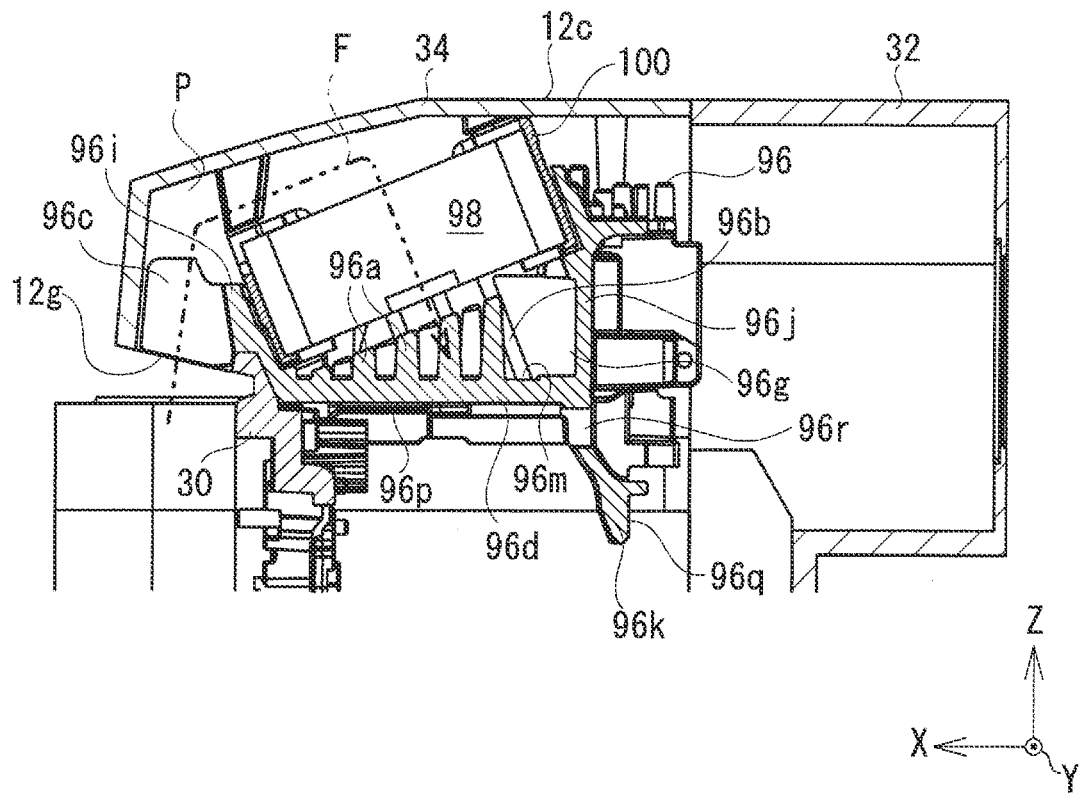
FIG. 14 is a partial cross-sectional view showing an air flow in the upward protruding portion in the first imaging apparatus according to an embodiment of the present disclosure.
Figure 15:
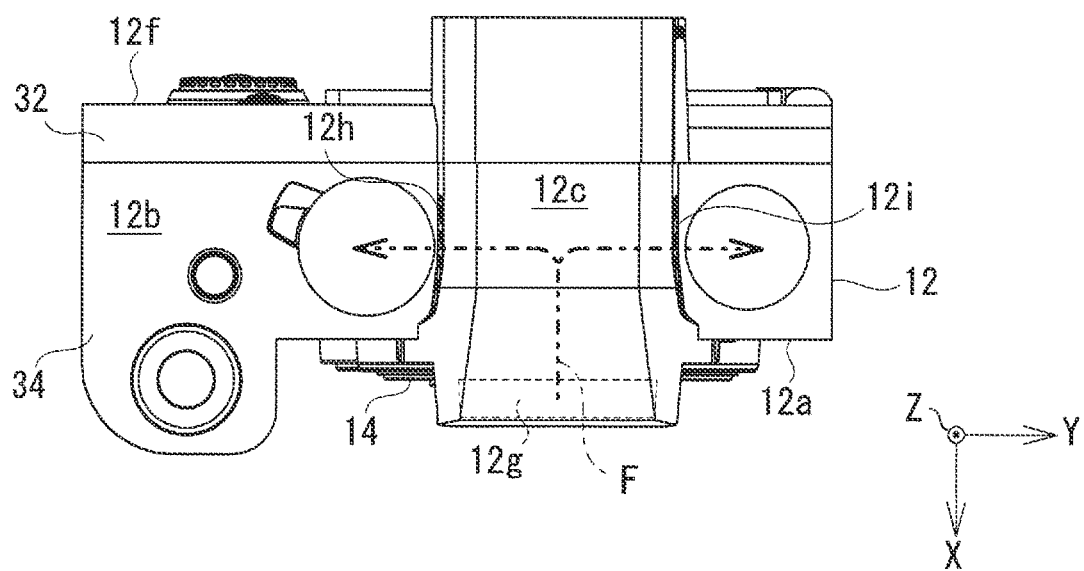
FIG. 15 is a top view showing an air flow in the upward protruding portion in the first imaging apparatus according to an embodiment of the present disclosure.
Figure 16:
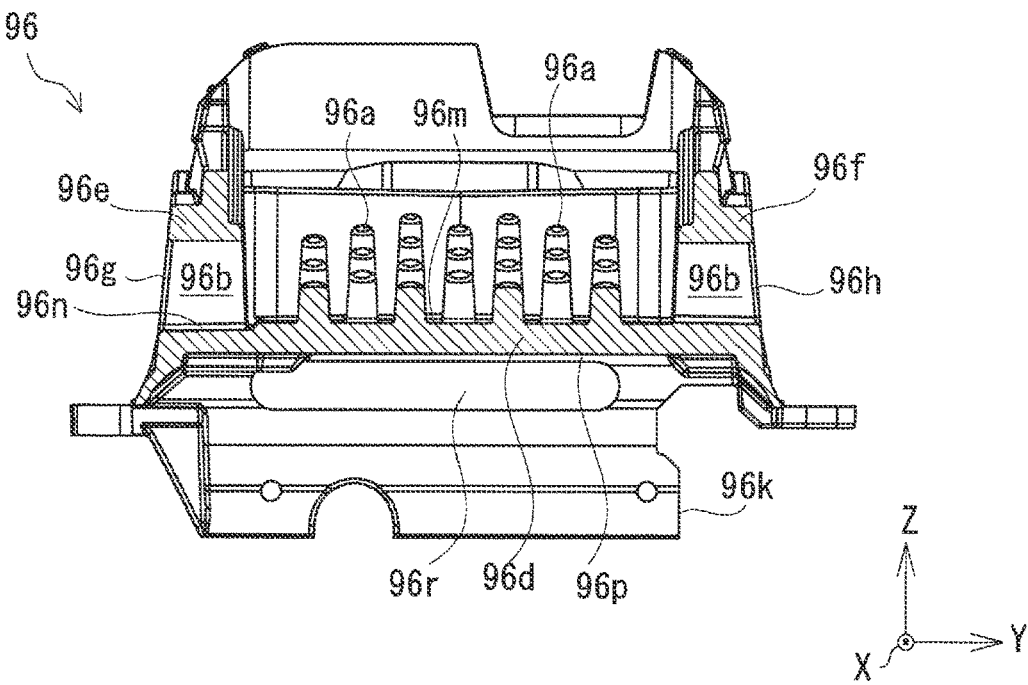
FIG. 16 is a cross-sectional view of a heat sink in the first imaging apparatus according to an embodiment of the present disclosure.
Figure 17:
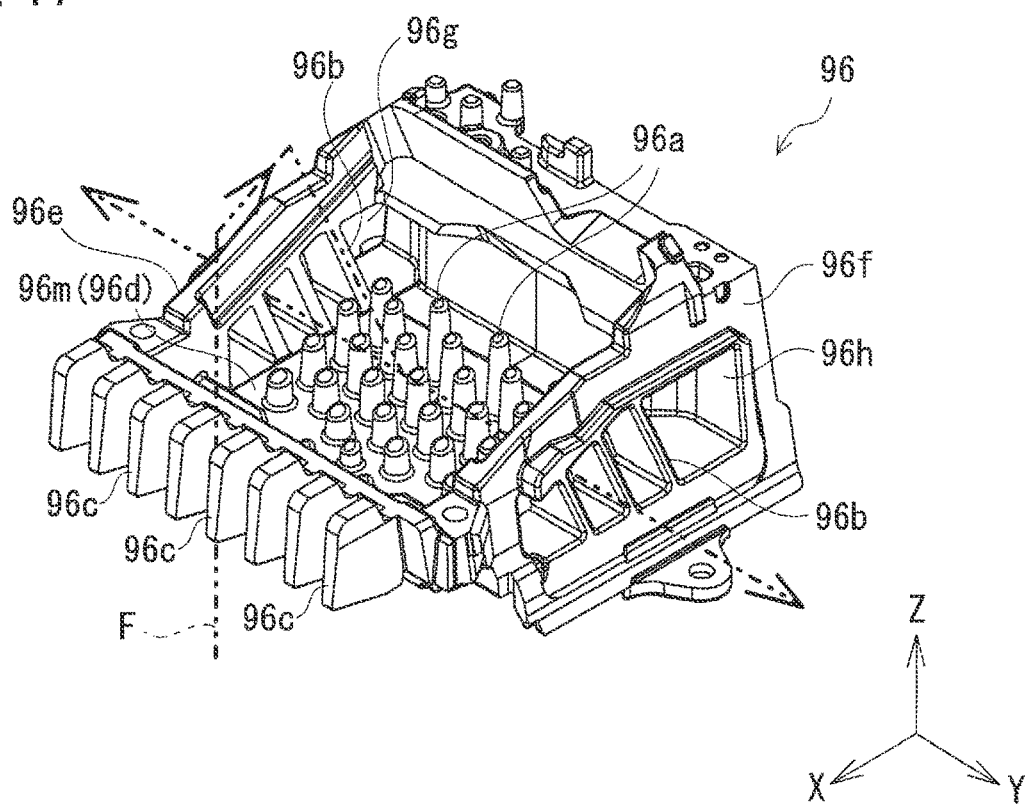
FIG. 17 is a perspective view showing an air flow with respect to the heat sink in the first imaging apparatus according to an embodiment of the present disclosure.

FIG. 13 is an exploded perspective view of the cooling module in the first imaging apparatus according to an embodiment of the present disclosure. In addition, FIG. 14 is a partial cross-sectional view showing an air flow in the upward protruding portion in the first imaging apparatus according to an embodiment of the present disclosure. Furthermore, FIG. 15 is a top view showing an air flow in the upward protruding portion in the imaging apparatus according to an embodiment of the present disclosure. In addition, FIG. 16 is a cross-sectional view of a heat sink. Then, FIG. 17 is a perspective view showing an air flow with respect to the heat sink.

As shown in FIGS. 13 and 14, the cooling module 90 includes a heat sink 96 (heat dissipation member) and a fan 98 that generates an air flow F for cooling the heat sink 96. In addition, the cooling module 90 includes a damper 100 for attaching the fan 98 to the heat sink 96. The damper 100 absorbs vibration of the fan 98. It should be noted that in the case of the present embodiment, the fan 98 is an axial flow fan, and is attached to the heat sink 96 so as to blow out air from obliquely upper front toward obliquely lower rear.

Figure 5:
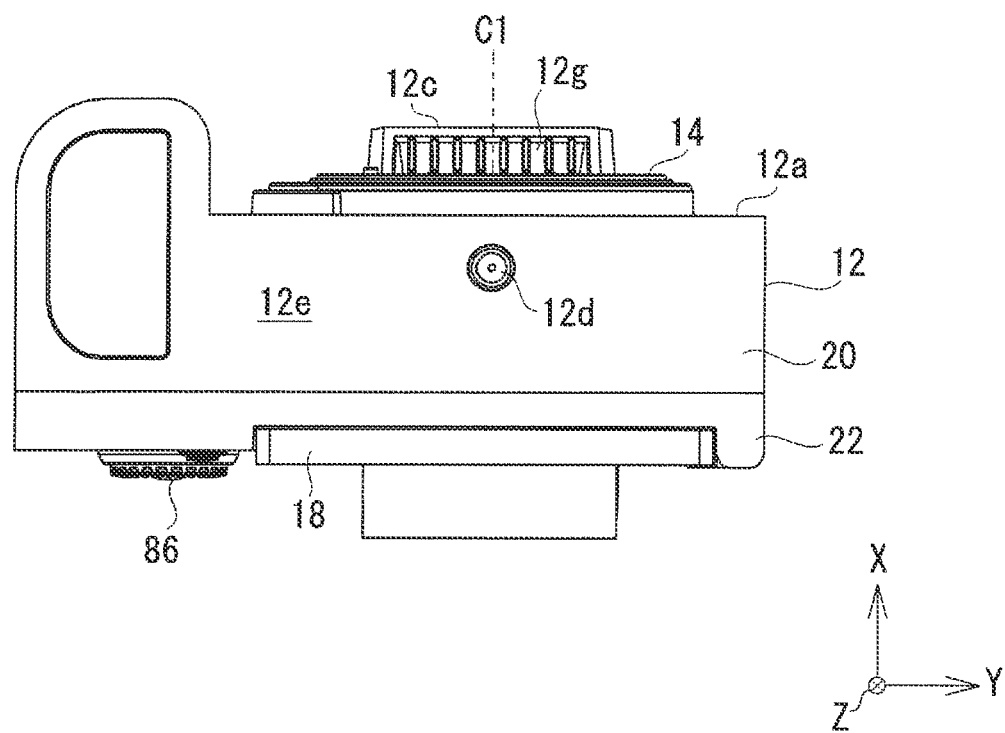
FIG. 5 is a bottom view of the first imaging apparatus according to an embodiment of the present disclosure.

As shown in FIGS. 14 and 15, a flow path P through which air flows (a flow path in which an air flow F is generated) is defined by the upward protruding portion 12c of the top casing 34 and the cooling module 90. The intake port 12g that is one end of the flow path P and the exhaust ports 12h and 12i that are the other ends are formed in the upward protruding portion 12c of the top casing 34. Specifically, in the case of the present embodiment, as shown in FIGS. 15 and 5, the intake port 12g is formed on a lower surface in a protruding portion of the upward protruding portion 12c protruding forward from the front surface 12a of the casing 12. In addition, as shown in FIG. 15, the exhaust ports 12h and 12i are formed on the left side surface and the right side surface of the upward protruding portion 12c. The exhaust ports 12h and 12i face each other in the left-right direction (Y-axis direction). The heat sink 96 of the cooling module 90 is disposed between the exhaust ports 12h and 12i.

The heat sink 96 includes a first fin 96a, a second fin 96b, and a third fin 96c disposed in the flow path P. In the case of the present embodiment, the heat sink 96 has a box shape including an opening covered with the fan 98 as a lid in the upper portion, and is made of a material having high thermal conductivity, such as aluminum.

Specifically, as shown in FIGS. 13, 14, 16, and 17, in the present embodiment, the heat sink 96 includes a rectangular bottom plate portion 96d, and a pair of left side wall portion 96e and right side wall portion 96f erected (in the case of the present embodiment, erected in the height direction (Z-axis direction)) toward the fan 98 from both respective ends in the left-right direction (Y-axis direction) of the bottom plate portion 96d. The left side wall portion 96e and the right side wall portion 96f are respectively formed with vent holes 96g and 96h penetrating in the left-right direction and through which air passes.

In addition, as shown in FIG. 14, the heat sink 96 includes a front side wall portion 96i and a rear side wall portion 96j erected (in the present embodiment, erected in the height direction (Z-axis direction)) toward the fan 98 from both respective ends in the front-rear direction (X-axis direction) of the bottom plate portion 96d. Furthermore, as shown in FIG. 14, the heat sink 96 includes a tongue piece portion 96k extending in a direction away from the fan 98 (in the case of the present embodiment, downward direction) from one end (in the case of the present embodiment, rear end) in the front-rear direction of the bottom plate portion 96d.

As shown in FIG. 14, the plurality of first fins 96a are erected in the height direction (Z-axis direction) toward the fan 98 from the first surface 96m of the bottom plate portion 96d of the heat sink 96 facing the fan 98. The first fin 96a is a pin-shaped fin, and has a circular cross section in the case of the present embodiment. In addition, in the case of the present embodiment, as shown in FIG. 17, the plurality of first fins 96a are arranged in a staggered manner on the first surface 96m.

As shown in FIGS. 13, 16, and 17, the plurality of second fins 96b are provided side by side in the front-rear direction (X-axis direction) at intervals in each of the vent hole 96g of the left side wall portion 96e and the vent hole 96h of the right side wall portion 96f of the heat sink 96. The second fin 96b is a plate-shaped fin extending in the left-right direction (Y-axis direction) and the height direction (Z-axis direction).

As shown in FIGS. 13 and 14, the plurality of third fins 96c protrude forward from the front side wall portion 96i of the heat sink 96, and are provided side by side in the left-right direction (Y-axis direction) at intervals. The third fin 96c is a plate-shaped fin extending in the front-rear direction (X-axis direction) and the height direction (Z-axis direction). As shown in FIGS. 14 and 5, the third fin 96c is disposed in the intake port 12g.

As shown in FIG. 17, in the air flow F, the third fin 96c is positioned on the most upstream side, and the second fin 96b is positioned on the most downstream side. That is, the air entering the intake port 12g by the rotation of the fan 98 first passes between the plurality of third fins 96c. Next, while passing between the plurality of first fins 96a, the air is guided to the first surface 96m of the bottom plate portion 96d and branches in a direction toward each of the two vent holes 96g and 96h. Then, as shown in FIG. 15, the air passes between the second fins 96b provided in each of the vent holes 96g and 96h, and then flows out to the outside through the exhaust ports 12h and 12i provided in the upward protruding portion 12c of the casing 12.

As shown in FIG. 13, the heat sink 96 is provided with ring seals 102 and 104 that close the gap between the upward protruding portion 12c and the heat sink 96 so that the air having passed through each of the vent holes 96g and 96h of the heat sink 96 passes through the exhaust ports 12h and 12i without exception. In addition, the heat sink 96 is provided with finger guards 106 and 108 that prevent a user's finger from entering the exhaust ports 12h and 12i.

It should be noted that there is a possibility that liquid such as rain enters the upward protruding portion 12c through the exhaust ports 12h and 12i and collects on the bottom plate portion 96d of the heat sink 96. As a countermeasure against this, as shown in FIG. 16, the bottom surface 96n of the vent hole 96g of the heat sink 96 is positioned at a lower level than the first surface 96m of the bottom plate portion 96d. With this vent hole 96g, the liquid on the bottom plate portion 96d of the heat sink 96 is likely to come out to the outside of the upward protruding portion 12c.

Figure 18:
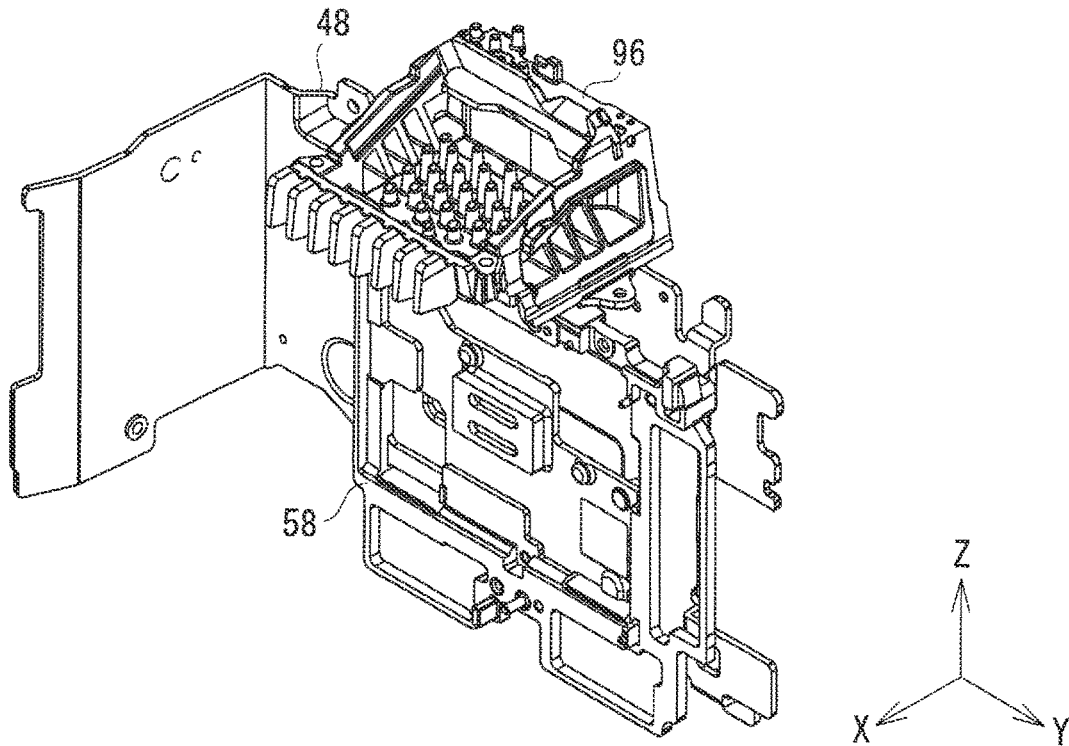
FIG. 18 is a perspective view showing connection between the heat sink and an object to be cooled in the first imaging apparatus according to an embodiment of the present disclosure.
Figure 19:
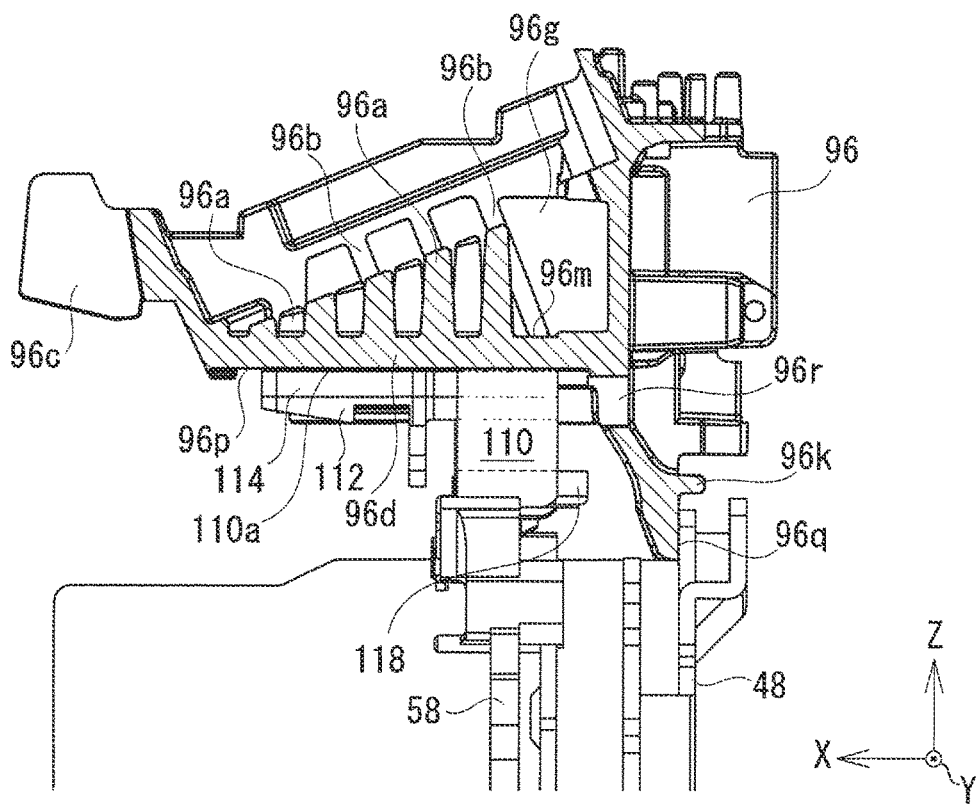
FIG. 19 is a sectional view showing connection between the heat sink and an object to be cooled in the first imaging apparatus according to an embodiment of the present disclosure.

FIGS. 18 and 19 are a perspective view and a cross-sectional view showing connection between a heat sink and objects to be cooled in the first imaging apparatus according to an embodiment of the present disclosure.

As described above, the cooling module 90 is for forcibly cooling the image sensor 54 on the sensor module 50 of the imaging module 40 and the IC chip 84 on the main circuit board 44. To that end, as shown in FIGS. 18 and 19, the heat sink 96 of the cooling module 90 is connected to the movable frame 58 that supports the image sensor 54 being a heat source and the heat transfer plate 48 that is in contact with the IC chip 84 being a heat source. That is, the movable frame 58 and the heat transfer plate 48 are objects to be cooled by the cooling module 90.

As shown in FIG. 19, in the case of the present embodiment, the movable frame 58 of a first object to be cooled is in contact (connected) with the heat sink 96 of cooling module 90 through the heat conductive sheet 110.

Figure 20:
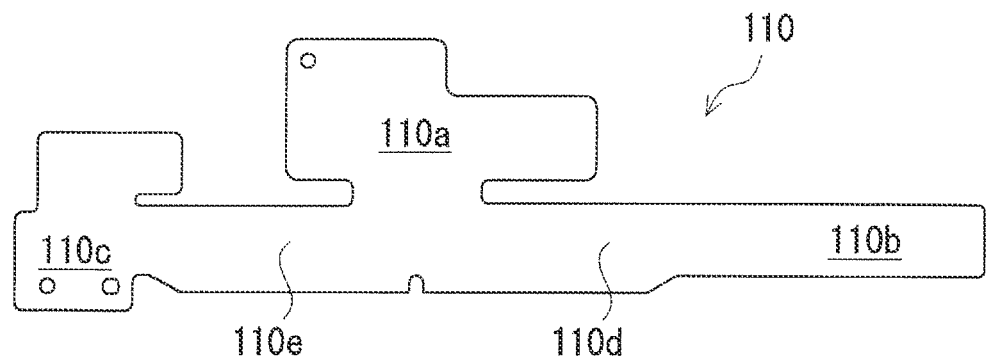
FIG. 20 is a developed view of a heat conductive sheet in the first imaging apparatus according to an embodiment of the present disclosure.
Figure 21:
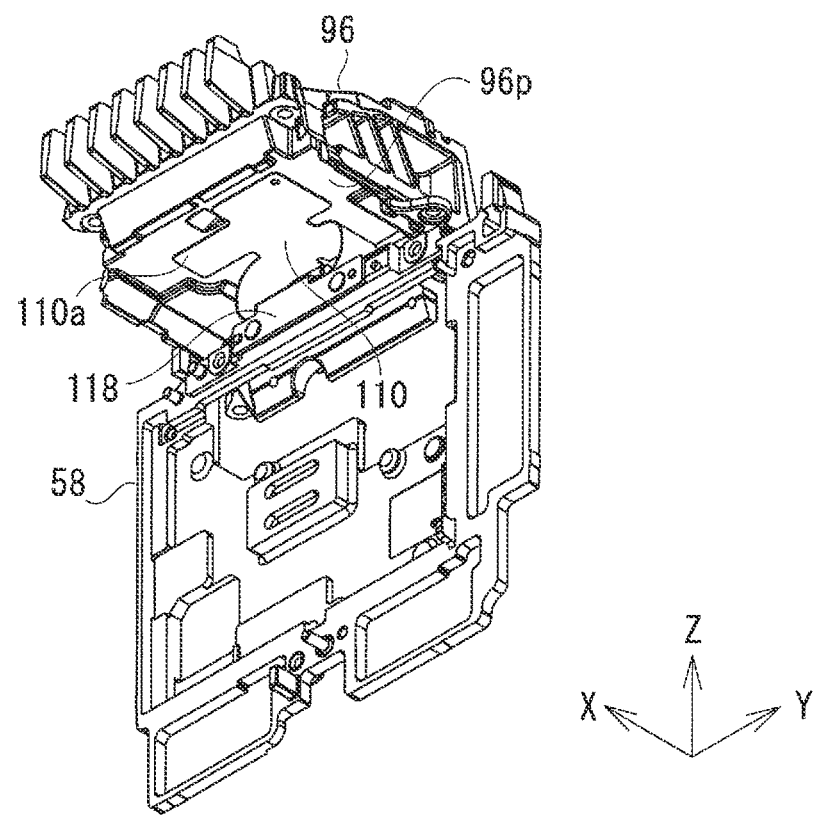
FIG. 21 is a lower perspective view showing connection between the heat sink and the heat conductive sheet in the first imaging apparatus according to an embodiment of the present disclosure.
Figure 22:
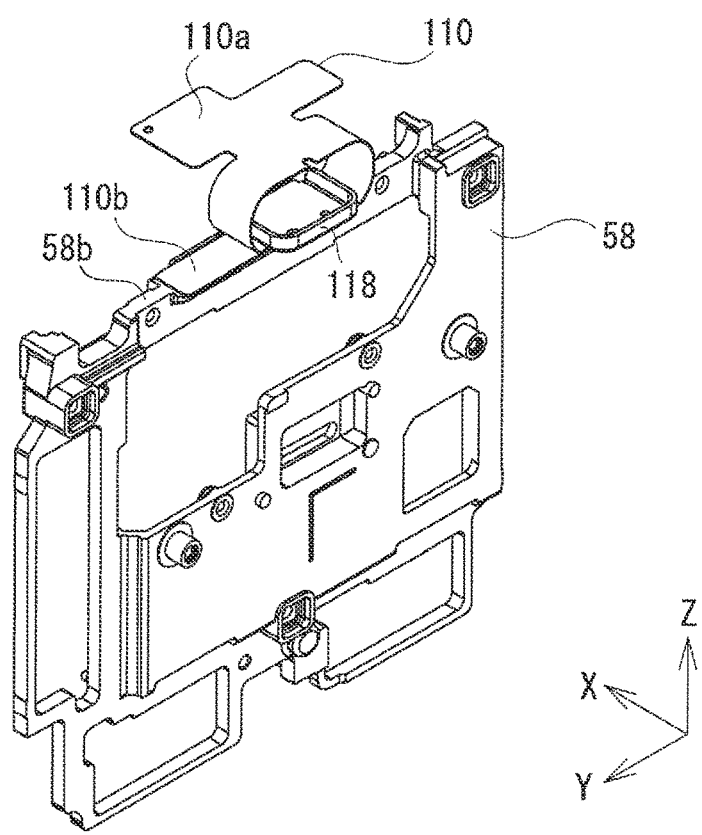
FIG. 22 is a rear perspective view showing connection between the heat conductive sheet and a first object to be cooled in the first imaging apparatus according to an embodiment of the present disclosure.
Figure 23:
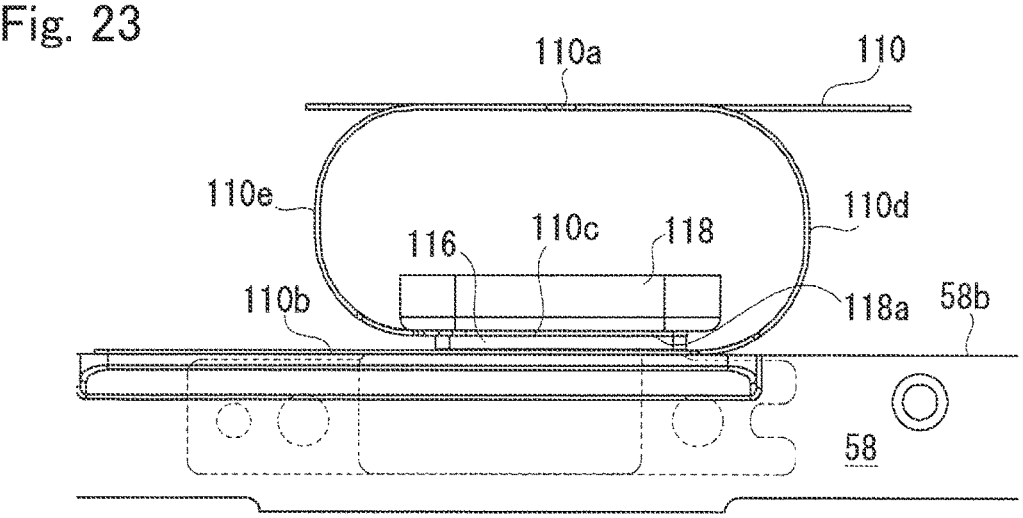
FIG. 23 is a rear view showing connection between the heat conductive sheet and the first object to be cooled in the first imaging apparatus according to an embodiment of the present disclosure.
Figure 24:
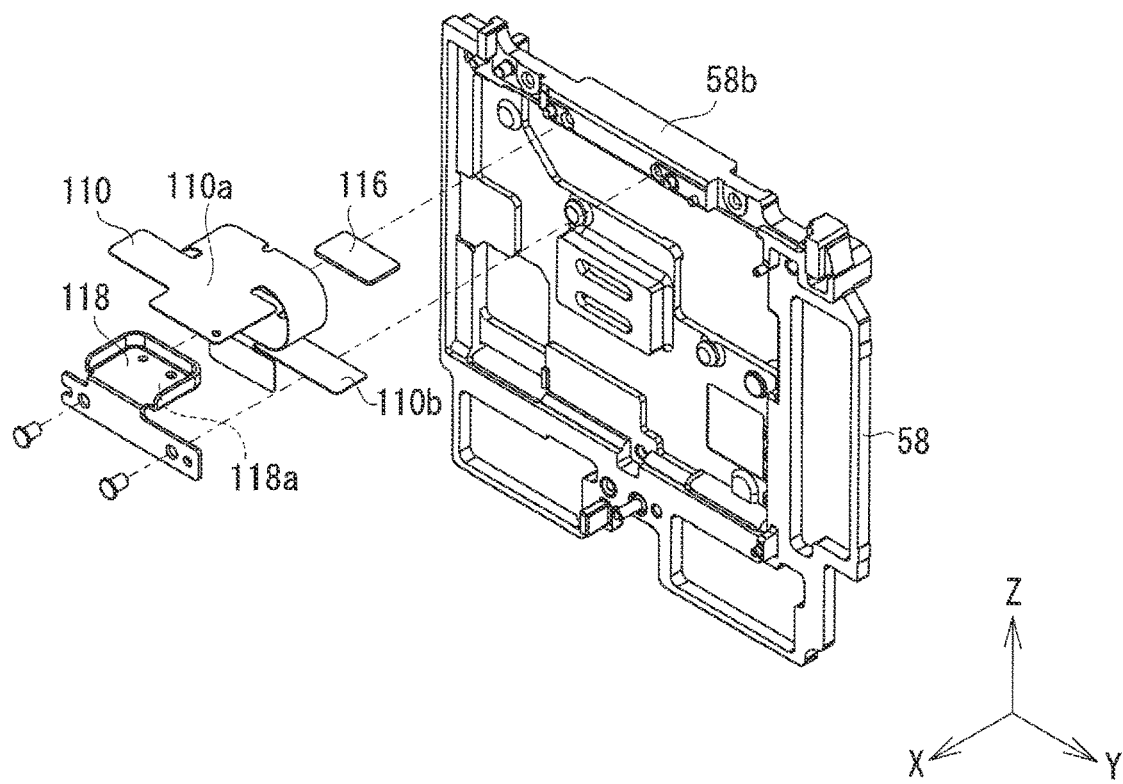
FIG. 24 is an exploded perspective view showing connection between the heat conductive sheet and the first object to be cooled in the first imaging apparatus according to an embodiment of the present disclosure.

FIG. 20 is a developed view of a heat conductive sheet in the first imaging apparatus according to an embodiment of the present disclosure. In addition, FIG. 21 is a lower perspective view showing connection between the heat sink and the heat conductive sheet in the first imaging apparatus according to an embodiment of the present disclosure. Furthermore, FIG. 22 is a rear perspective view showing connection between the heat conductive sheet and the first object to be cooled in the first imaging apparatus according to an embodiment of the present disclosure. Furthermore, FIG. 23 is a partial rear view showing connection between the heat conductive sheet and the first object to be cooled in the first imaging apparatus according to an embodiment of the present disclosure. Then, FIG. 24 is an exploded perspective view showing connection between the heat conductive sheet and the first object to be cooled in the first imaging apparatus according to an embodiment of the present disclosure.

As shown in FIG. 20, the heat conductive sheet 110 is made of, for example, a material having high thermal conductivity and flexibility. In the case of the present embodiment, the heat conductive sheet 110 is a graphite sheet made of graphite having high thermal conductivity.

As shown in FIGS. 20 to 23, the heat conductive sheet 110 includes a heat dissipating portion 110a connected to (in contact with) the heat sink 96, and first and second heat absorbing portions 110b and 110c connected to (in contact with) the movable frame 58 of an object to be cooled. The first and second heat absorbing portions 110b and 110c are provided in a pair of belt-shaped portions 110d and 110e extending in opposite directions to each other.

As shown in FIG. 21, the heal dissipating portion 110a of the heat conductive sheet 110 is connected to (in contact with) the second surface 96p (first connection portion) of the bottom plate portion 96d of the heat sink 96. The second surface 96p is a surface opposite to the first surface 96m on which the first fins 96a are provided. Heat is released from the heat conductive sheet 110 to the heat sink 96 through the heat dissipating portion 110a.

It should be noted that as shown in FIG. 19, the contact between the heat dissipating portion 110a of the heat conductive sheet 110 and the second surface 96p of the bottom plate portion 96d of the heat sink 96 is maintained by a sheet pressing member 112. The sheet pressing member 112 is in contact with the heat conductive sheet 110 with interposition of an elastic member 114 such as urethane foam, thereby maintaining contact between the heat conductive sheet 110 and the heat sink 96, It should be noted that as shown in FIGS. 9 and 10, the sheet pressing member 112 is attached to the front frame 60 of the sensor module 50.

As shown in FIG. 23, the first and second heat absorbing portions 110b and 110c of the heat conductive sheet 110 are connected to the movable frame 58, Specifically, the first heat absorbing portion 110b and the second heat absorbing portion 110O are connected to the top surface 58b of the movable frame 58 in a state of overlapping each other. Strictly speaking, the first heat absorbing portion 110b is directly connected to the top surface 58b, and the second heat absorbing portion 110c is indirectly in contact with the top surface 58b. That is, the pair of belt-shaped portions 110d and 110e forms a loop, whereby the first heat absorbing portion 110b and the second heat absorbing portion 110c overlap each other.

In addition, an elastic member 116 such as urethane foam is disposed between the first heat absorbing portion 110b and the second heat absorbing portion 110c. The layered body of the first heat absorbing portion 110b, the elastic member 116, and the second heat absorbing portion 110c is sandwiched between the bottom surface 118a of the sheet pressing member 118 fixed to the movable frame 58 and the top surface 58b of the movable frame 58. The elastic member 116 causes the first heat absorbing portion 110b to be urged toward and keep in contact with the top surface 58b of the movable frame 58, and causes the second heat absorbing portion 110c to be urged toward and keep in contact with the bottom surface 118a of the sheet pressing member 118. With this elastic member 116, connection between the first heat absorbing portion 110b and the movable frame 58 and connection between the second heat absorbing portion 110c and the movable frame 58 with interposition of the sheet pressing member 118 are maintained.

In the case of the present embodiment, as with the movable frame 58, the sheet pressing member 118 is made of a material having high thermal conductivity such as aluminum. Accordingly, the heat of the movable frame 58 directly transfers to the first heat absorbing portion 110b, and transfers to the second heat absorbing portion 110c through the sheet pressing member 118. In this case, the elastic member 116 may be made of a material having low thermal conductivity.

It should be noted that the movable frame 58 and the sheet pressing member 118 may be integrated as one component.

The reason why the movable frame 68 and the heat sink 96 are connected through the heat conductive sheet 110 is that the movable frame 58 is displaced with respect to the heat sink 96. When the movable frame 58 is displaced, the heat conductive sheet 110 is deformed. In order to facilitate the deformation, as shown in FIG. 23, the heat conductive sheet 110 is disposed between the movable frame 58 and the heat sink 96 so that the thickness direction thereof coincides with the displacement direction (left-right direction (Y axis direction) and the height direction (Z-axis direction)) of the movable frame 58.

Unlike the movable frame 58, the heat transfer plate 48 being the second object to be cooled is directly connected to (in contact with) the heat sink 96.

Figure 25:
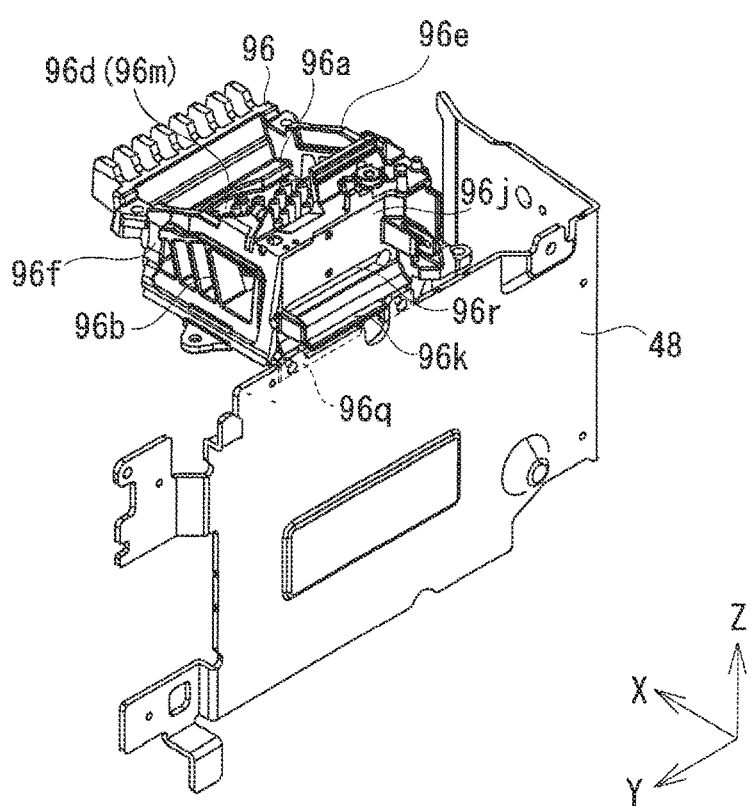
FIG. 25 is a rear perspective view showing connection between the heat sink and a second object to be cooled in the first imaging apparatus according to an embodiment of the present disclosure.
Figure 26:
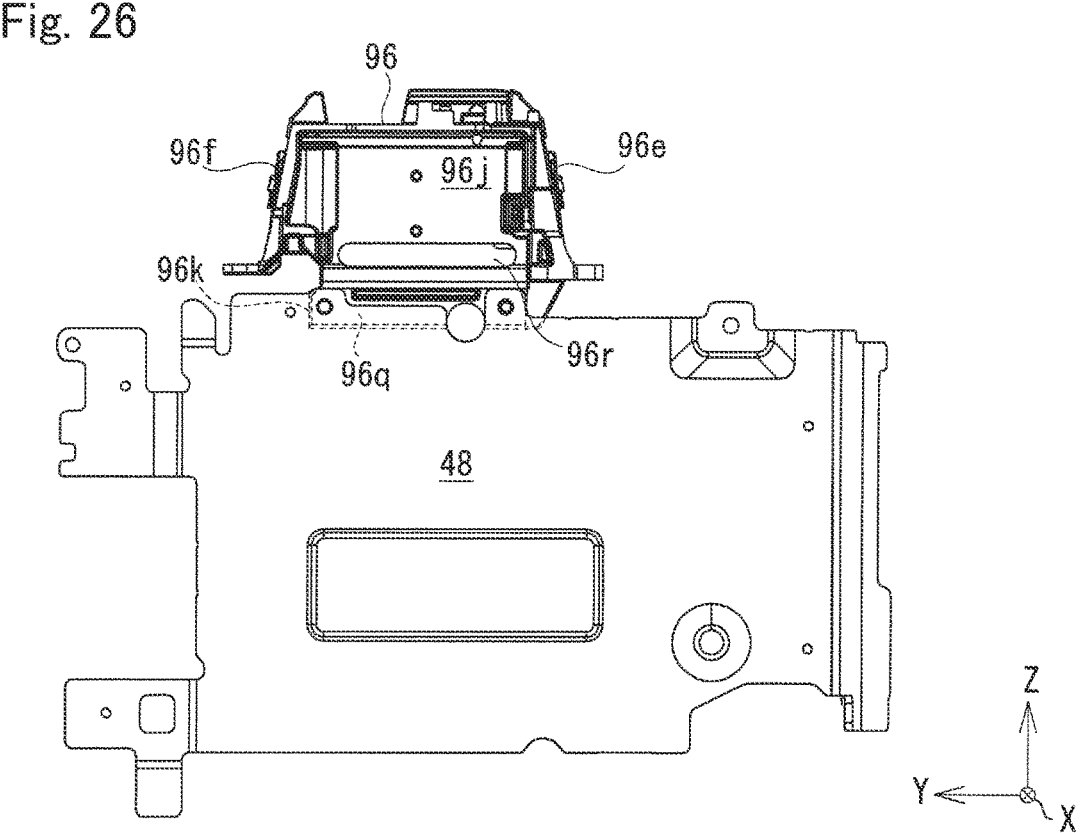
FIG. 26 is a rear view showing connection between the heat sink and the second object to be cooled in the first imaging apparatus according to an embodiment of the present disclosure.
Figure 27:
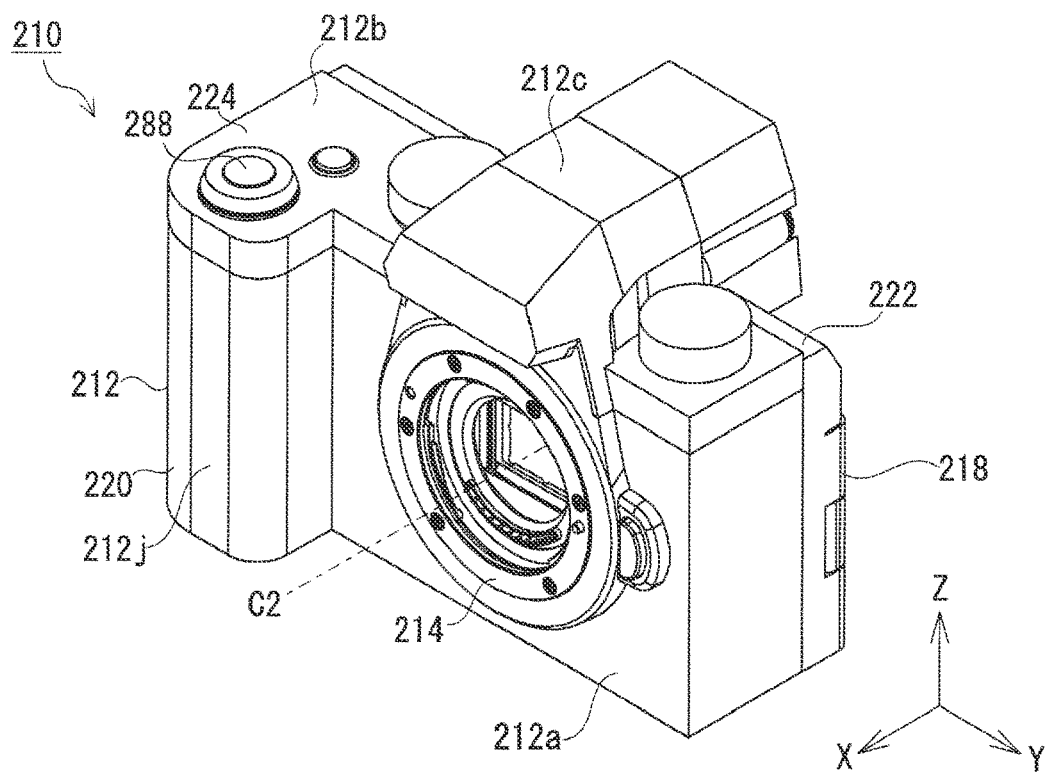
FIG. 27 is a right front perspective view of a second imaging apparatus in an imaging apparatus system according to an embodiment of the present disclosure.
Figure 28:
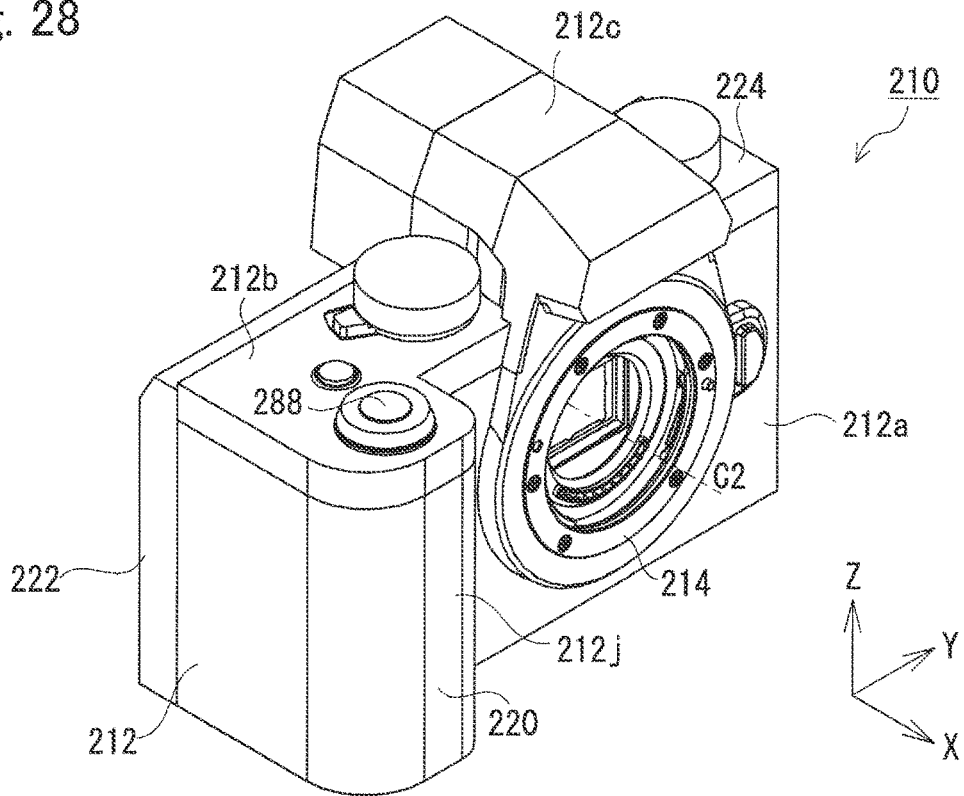
FIG. 28 is a left front perspective view of the second imaging apparatus according to an embodiment of the present disclosure.

FIGS. 25 and 26 are a rear perspective view and a rear view showing connection between a heat sink and a second object to be cooled in the first imaging apparatus according to an embodiment of the present disclosure.

As shown in FIGS. 25 and 26, the heat sink 96 includes a contact surface 96*q* (second connection portion) for coming into contact with the heat transfer plate 48 in the tongue piece portion 96*k* thereof. The heat transfer plate 48 keeps in contact with the contact surface 96*q* by being fixed to the tongue piece portion 96*k* by, for example, a screw or the like.

So far, the first imaging apparatus of the imaging apparatus system according to an embodiment of the present disclosure has been described. Hereinafter, a second imaging apparatus of the imaging apparatus system different from the first imaging apparatus will be described.

FIGS. 27 to 31 are a right front perspective view, a left front perspective view, a rear perspective view, a front view, and a bottom view of a second imaging apparatus in an imaging system according to an embodiment of the present disclosure. It should be noted that a part of the second imaging apparatus is schematically illustrated.

A second imaging apparatus 210 according to the present embodiment is an imaging apparatus of a type different from the first imaging apparatus 10.

As shown in FIGS. 27 to 31, the second imaging apparatus 210 according to the present embodiment has a design similar to that of a single-lens reflex type camera as with the first imaging apparatus 10. The second imaging apparatus 210 includes a casing 212. The casing 212 is provided with a lens mount 214 (second lens mount) and an electronic viewfinder (EVF) 216 (second electronic viewfinder). Specifically, the lens mount 214 is provided on the front surface 212*a* of the casing 212. The electronic viewfinder 216 is provided in an upward protruding portion 212*c* protruding from a substantially central portion in the left-right direction of the top surface 212*b* of the casing 212. In addition, the electronic viewfinder 216 outputs an image through a finder window 212*k* provided on the rear surface of the upward protruding portion 212*c*. The lens mount 214 and the electronic viewfinder 216 are provided so as to intersect with a virtual plane (Z-X plane) extending in the height direction (Z-axis direction) including the optical axis C2 of the lens mount 214 (the optical axis of the lens to be mounted on the lens mount 214). In addition, a female screw hole 212*d* (second female screw hole) for mounting the camera platform is provided in the bottom surface 212*e* of the casing 212 so as to intersect with the virtual plane.

In addition, in the case of the second imaging apparatus 210, a van-angle monitor 218 is provided on the rear surface 212*f* of the casing 212. The van-angle monitor 218 is provided in the casing 212 so as to be pivotable about a first rotation center line R3 extending in the height direction (Z-axis direction) and a second rotation center line R4 extending in a direction orthogonal to the first rotation center line R3.

Figure 32:
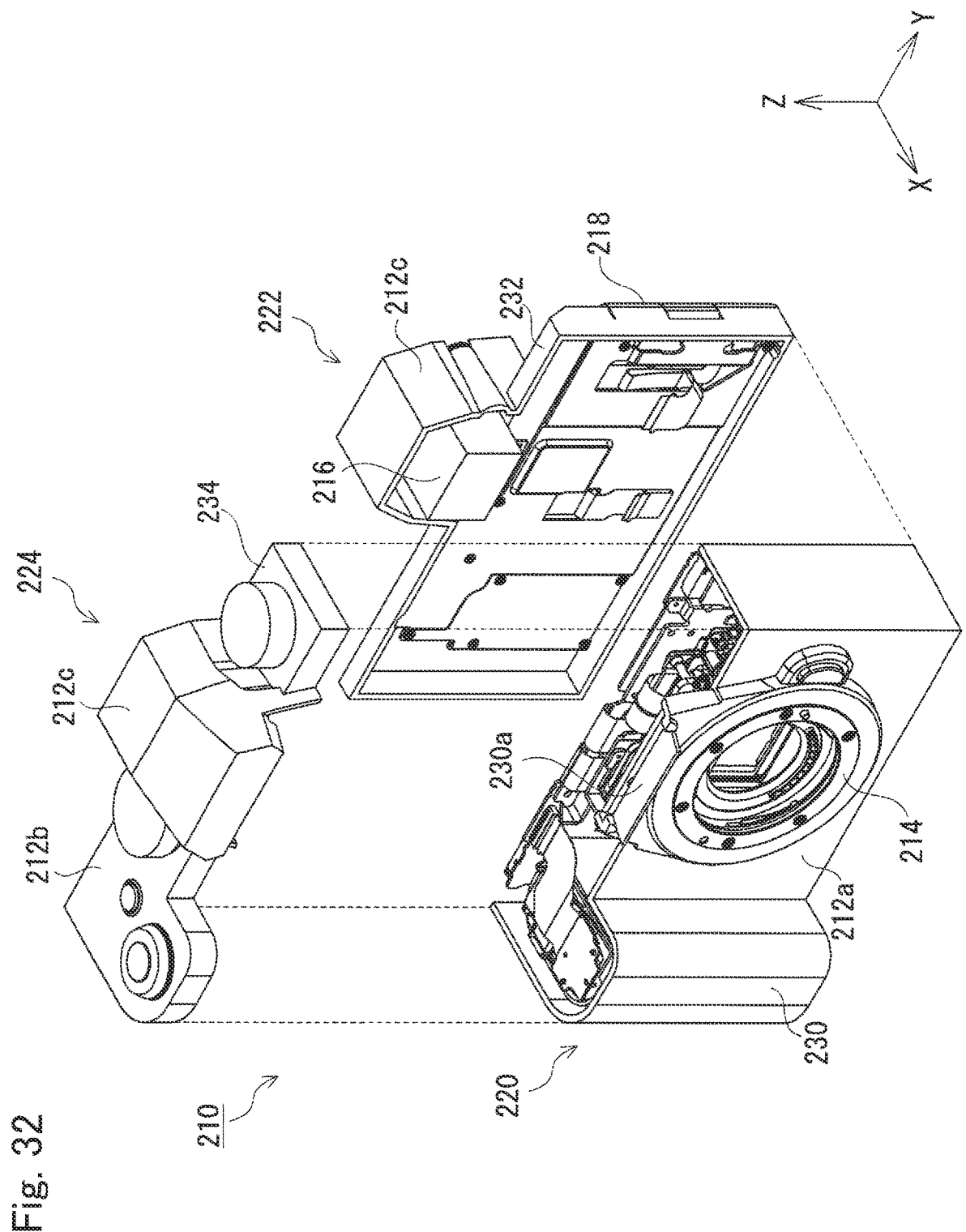
FIG. 32 is an exploded perspective view of the second imaging apparatus according to an embodiment of the present disclosure.

FIG. 32 is an exploded perspective view of the second imaging apparatus according to an embodiment of the present disclosure.

As shown in FIG. 32, the second imaging apparatus 210 also includes a front unit 220, a rear unit 222, and a top unit 224 as with the first imaging apparatus 10.

The front unit 220 constitutes a part of the casing 212 and includes a front casing 230 (second front casing) including at least a front surface 212*a* of the casing 212. It should be noted that the front casing 230 may include the entire front surface 212*a* or a part of the front surface 212*a*.

The rear unit 222 constitutes a part of the casing 212 and includes a rear casing 232 including at least a rear surface 212*f* of the casing 212. The rear casing 232 includes a rear side portion of the upward protruding portion 212*c*. It should be noted that the rear casing 232 may include the entire rear surface 212*f* or a part of the rear surface 212*f*.

The top unit 224 constitutes a part of the casing 212 and includes a top casing 234 (second top casing) including at least a top surface 212*b* of the casing 212. The top casing 234 includes a front side portion of the upward protruding portion 212*c*. It should be noted that the top casing 234 may include the entire top surface 212*b* or may include a part of the top surface 212*b*.

The casing 212 of the second imaging apparatus 210 is formed by fixing the front casing 230, the rear casing 232, and the top casing 234 to each other through, for example, screws.

Figure 33:
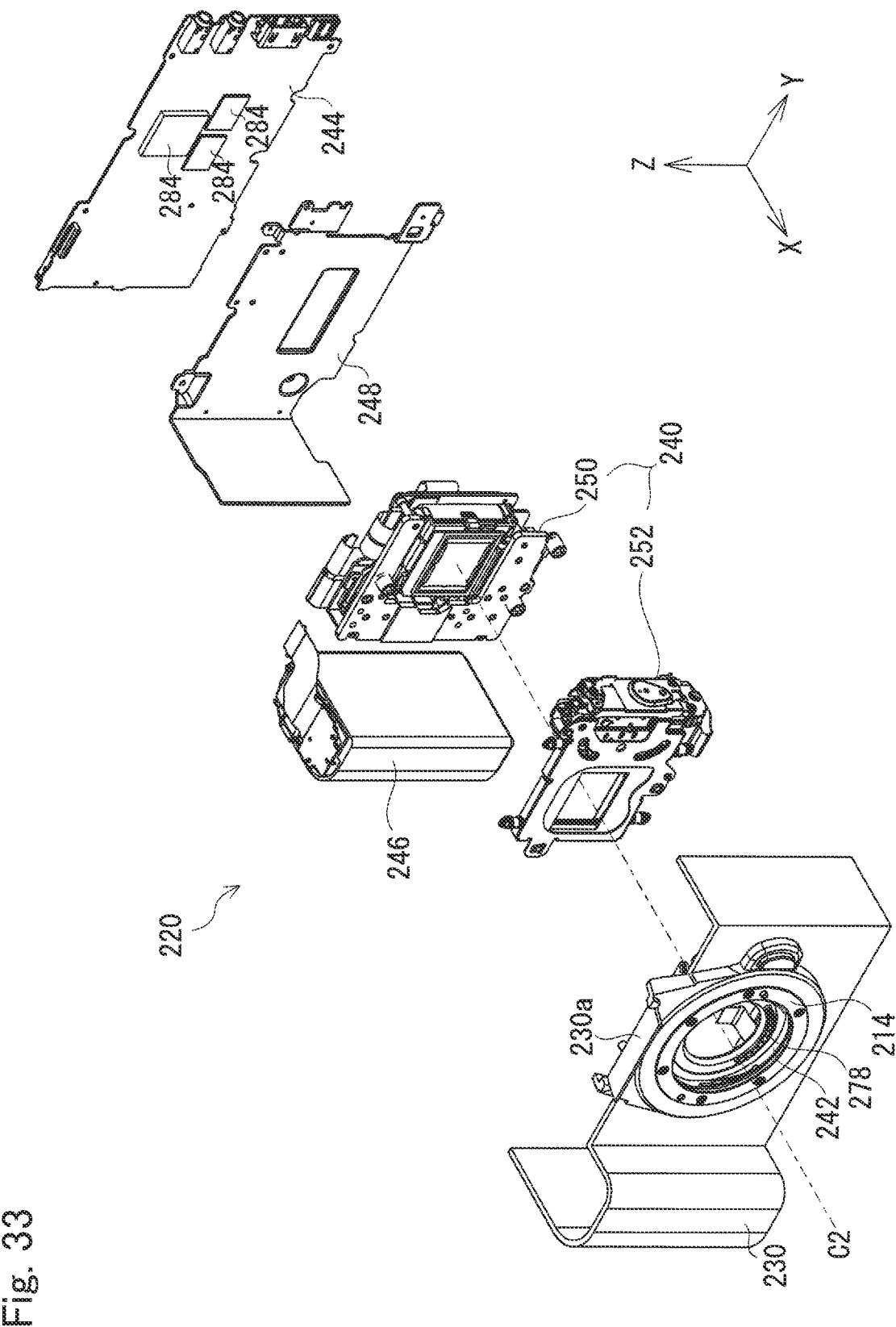
FIG. 33 is a front exploded perspective view of a front unit in the second imaging apparatus according to an embodiment of the present disclosure.
Figure 34:
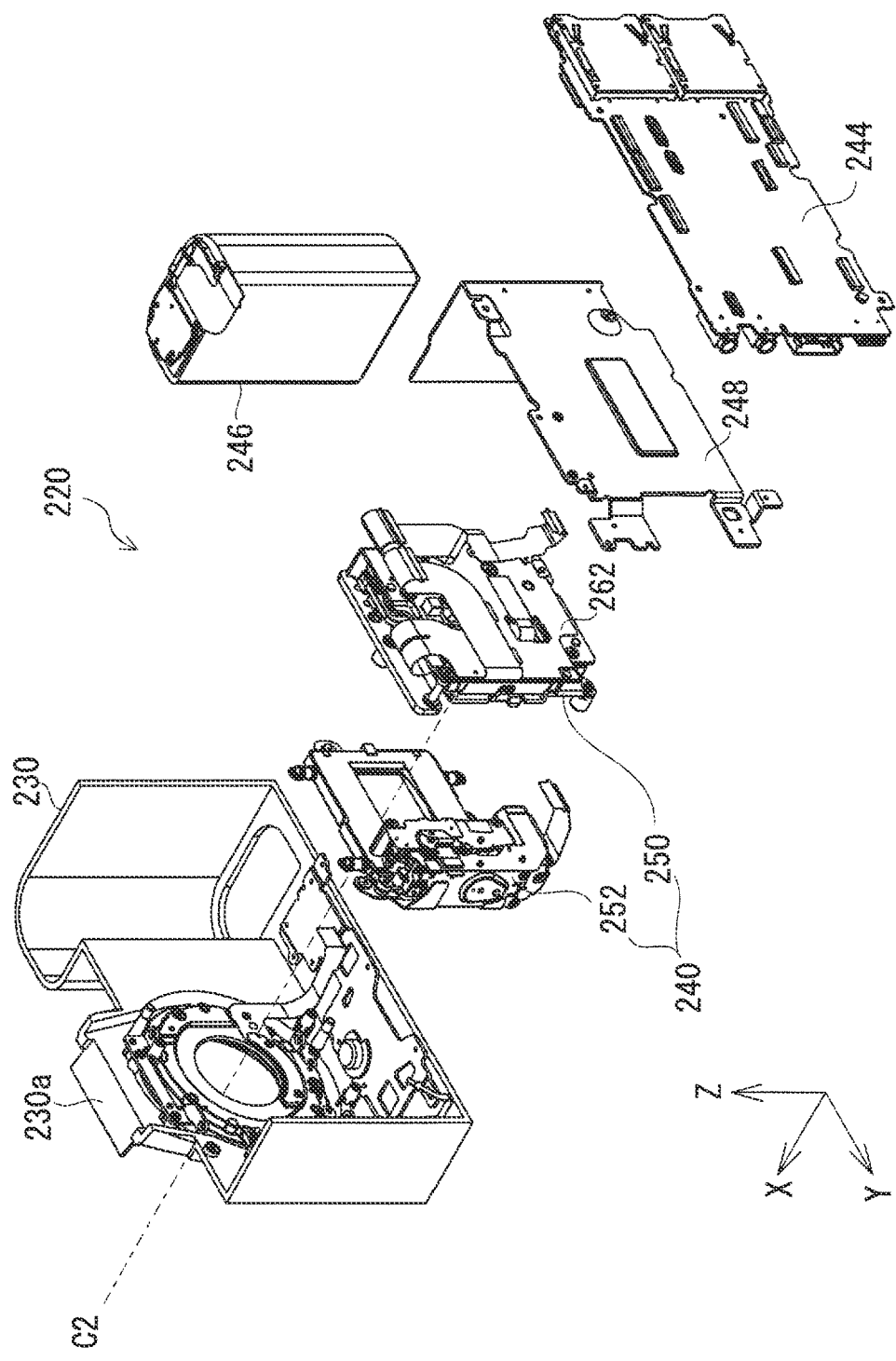
FIG. 34 is a rear exploded perspective view of the front unit in the second imaging apparatus according to an embodiment of the present disclosure.

FIGS. 33 and 34 are a front exploded perspective view and a rear exploded perspective view of the front unit in the second imaging apparatus according to an embodiment of the present disclosure.

As shown in FIGS. 33 and 34, in addition to the front casing 230, the front unit 220 includes an imaging module 240, a lens mount module 242, a main circuit board 244 (second circuit board), a battery 246, and a heat transfer plate 248. In addition, the imaging module 240 includes a sensor module 250 and a shutter module 252.

Figure 35:
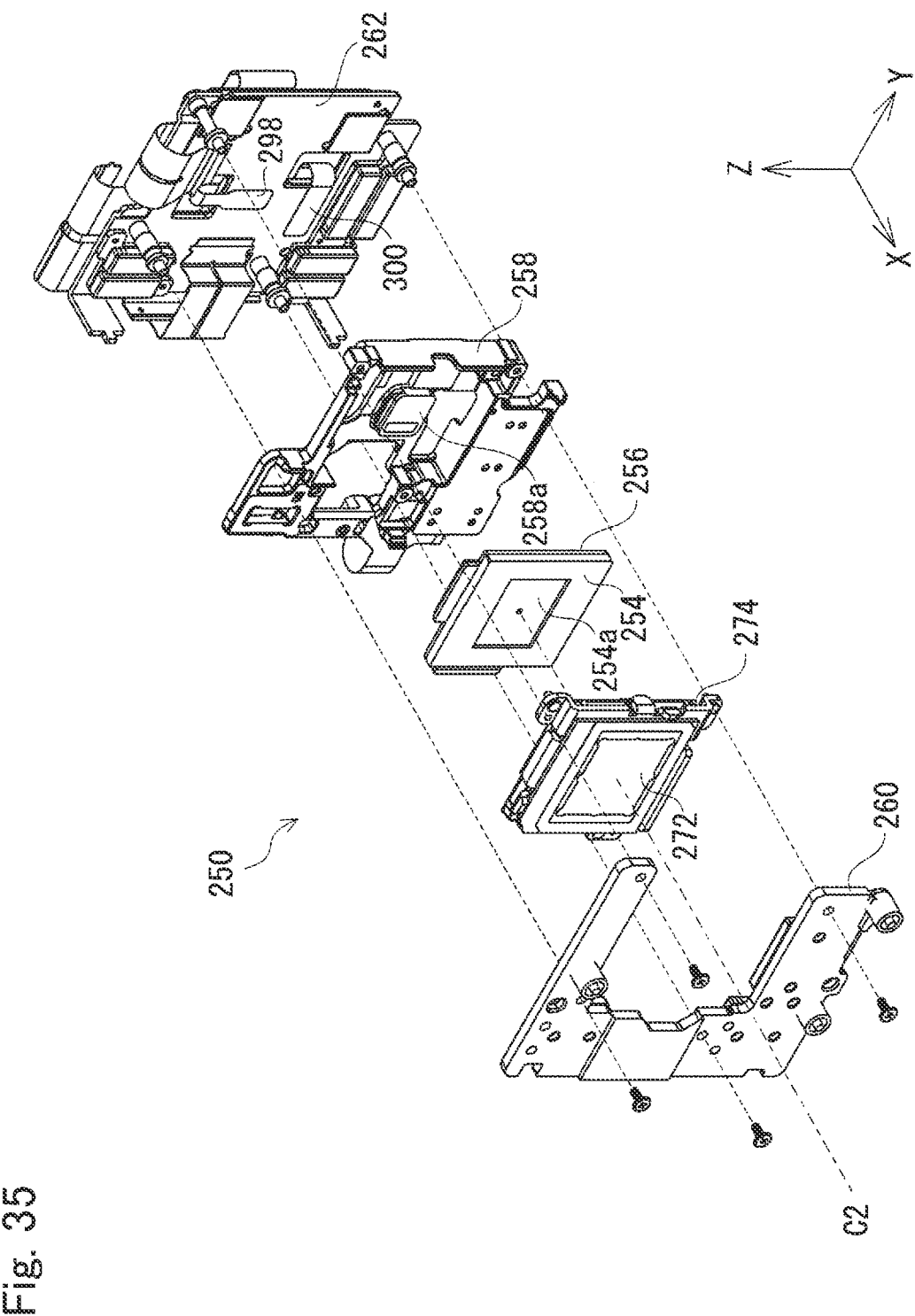
FIG. 35 is a front exploded perspective view of a sensor module in the second imaging apparatus according to an embodiment of the present disclosure.
Figure 36:
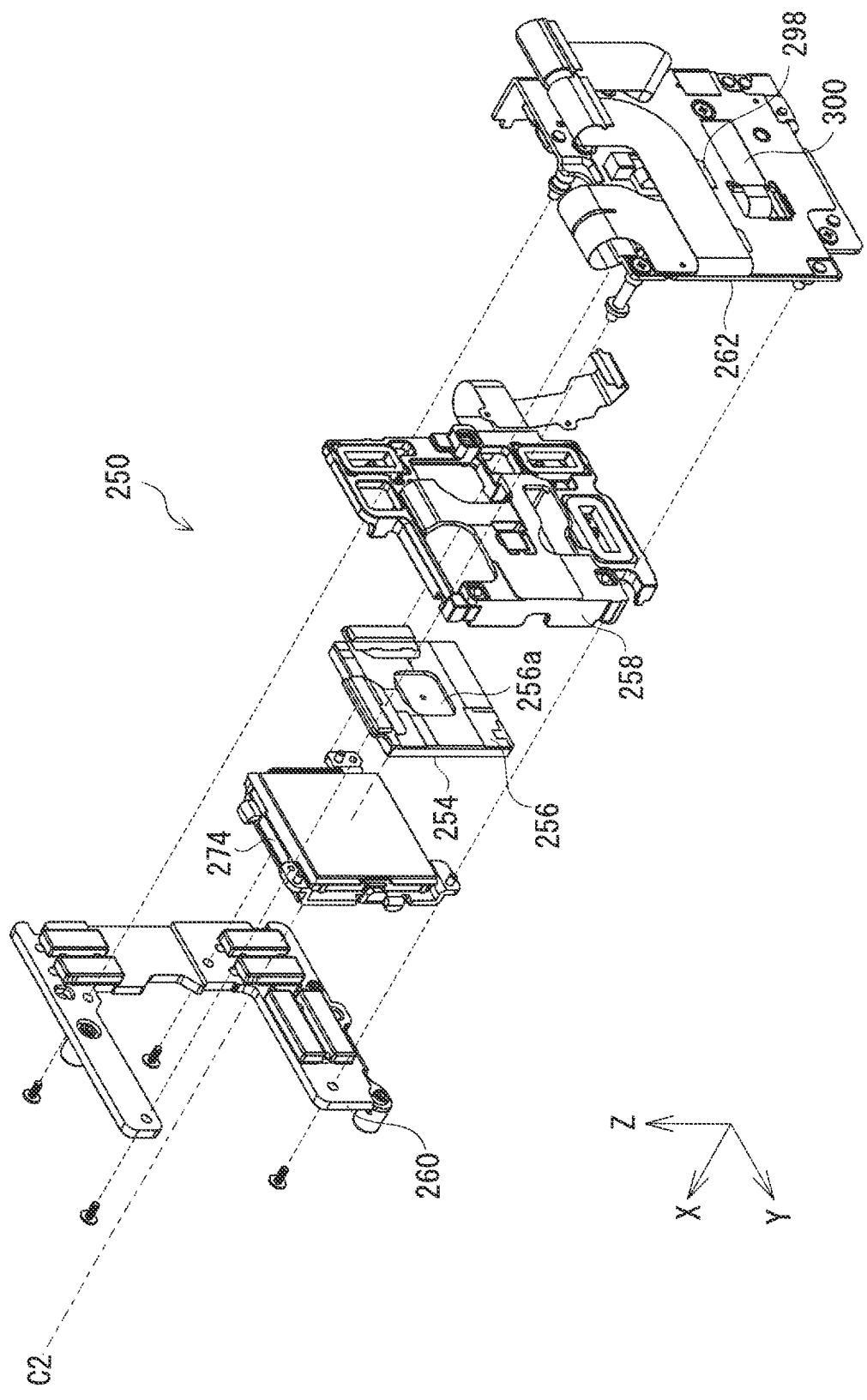
FIG. 36 is a rear exploded perspective view of the sensor module in the second imaging apparatus according to an embodiment of the present disclosure.

FIGS. 35 and 36 are a front exploded perspective view and a rear exploded perspective view of the sensor module in the second imaging apparatus according to an embodiment of the present disclosure.

As shown in FIGS. 35 and 26, the sensor module 250 of the imaging module 240 includes an image sensor 254 (second image sensor). In the case of the present embodiment, the image sensor 254 of the second imaging apparatus 210 is different from the image sensor 54 of the first imaging apparatus 10. The image sensor 254 of the second imaging apparatus 210 is a device that receives the image light transmitted through the lens mounted on the lens mount 214 by the light receiving surface 254*a* and converts the received image light into an electric signal. The image sensor 254 is mounted on the circuit board 256. The circuit board 256 is electrically connected to the main circuit board 244.

In addition, the second imaging apparatus 210 is also configured to be able to execute camera shake compensation as with the first imaging apparatus 10. To that end, the sensor module 250 of the second imaging apparatus 210 includes a movable frame 258 that supports the image sensor 254, and a front frame 260 and a rear frame 262 that movably support the movable frame 258 in the left-right direction (Y-axis direction) and the height direction (Z-axis direction). It should be noted that the sensor module 250 is fixed to the front casing 230 through the front frame 260. It should be noted that a method for displacing the movable frame 258, that is, displacing the image sensor 254 is substantially the same as a method for displacing the image sensor 54 in the first imaging apparatus 10.

In addition, the movable frame 258 is provided with a filter module 274 including a plurality of optical filters such as a protective glass 272 and an infrared cut glass so as to be positioned in front of the image sensor 254.

Furthermore, the image sensor 254 is connected to (in contact with) the movable frame 258 in a heat-transferable manner. Specifically, the projecting portion 258a provided in the movable frame 258 comes into contact with the image sensor 254 through the through hole 256a formed in the circuit board 256, whereby the image sensor 254 and the movable frame 258 are connected in a heat-transferable manner. Accordingly, heat of the image sensor 254 that generates heat during imaging is absorbed by the movable frame 258. It should be noted that the movable frame 258 is made of a material having high thermal conductivity such as aluminum in order to absorb heat of the image sensor 254. In addition, the transfer of heat from the movable frame 258 will be described below.

As shown in FIGS. 33 and 34, the shutter module 252 of the imaging module 240 is disposed in front of the sensor module 250. The shutter module 252 includes a shutter for adjusting an exposure time. The shutter module 252 is electrically connected to the main circuit board 244.

The lens mount module 242 includes an electronic contact 278 for electrically connecting the lens mount 214 and a lens mounted on the lens mount 214. The electronic contact 278 is electrically connected to the main circuit board 244.

The main circuit board 244 is disposed behind the imaging module 240. The battery 246 is electrically connected to the main circuit board 244. The main circuit board 244 controls the image sensor 254 of the sensor module 250, the shutter of the shutter module 252, the lens mounted on the lens mount 214, and the like.

The heat transfer plate 248 is a member for ooling a plurality of IC chips 284 mainly mounted on the main circuit board 244, and is in contact with the IC chip 284 through, for example, a heat transfer sheet (not shown). That is, the heat transfer plate 248 and the IC chip 284 are connected in a heat-transferable manner. The IC chip 284 is, for example, an image processing chip that generates image data based on an electric signal from the image sensor 254, and a memory that stores image data and the like. Heat of the IC chip 284 that generates heat during operation is absorbed by the heat transfer plate 248. It should be noted that the heat transfer plate 248 is made of a material having high thermal conductivity such as aluminum in order to absorb heat of the IC chip 284. In addition, the transfer of heat from the heat transfer plate 248 will be described below.

Figure 29:
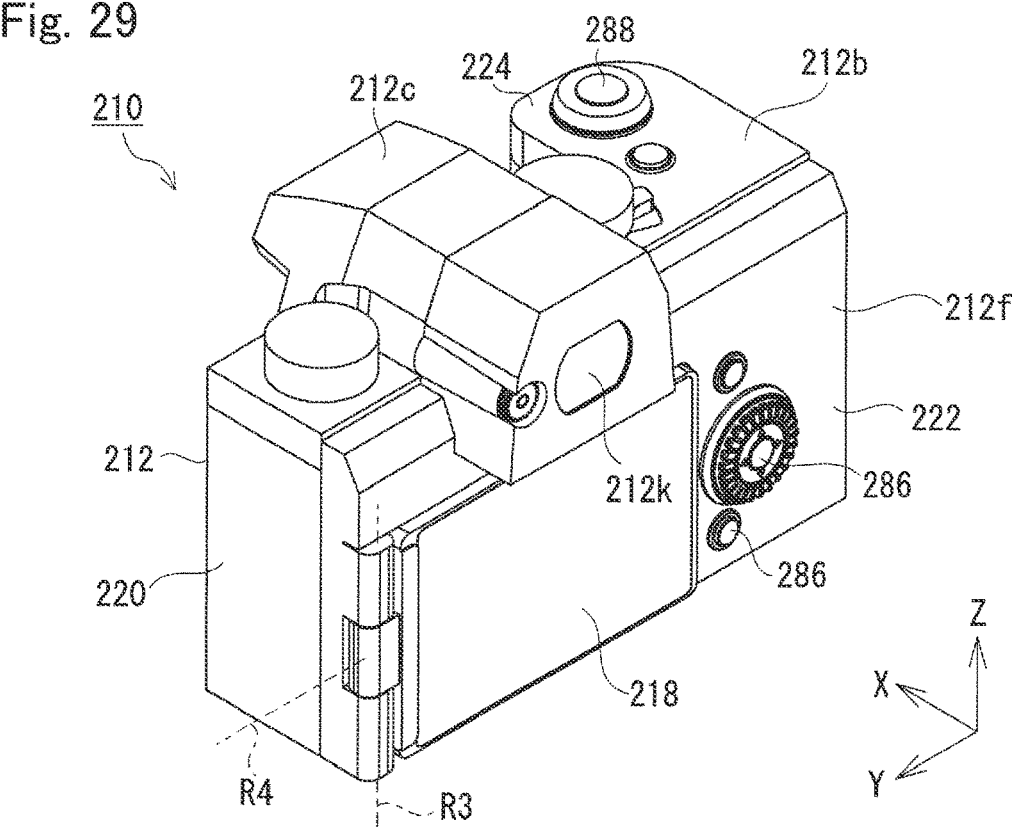
FIG. 29 is a rear perspective view of the second imaging apparatus according to an embodiment of the present disclosure.

As shown in FIGS. 29 and 32, the rear unit 222 includes an electronic viewfinder 216, a monitor 218, and a plurality of operation buttons 286 in addition to the rear casing 232. These are electrically connected to the main circuit board 244. Thereby, the electronic viewfinder 216 and the monitor 218 are controlled by the main circuit board 244.

Figure 37:
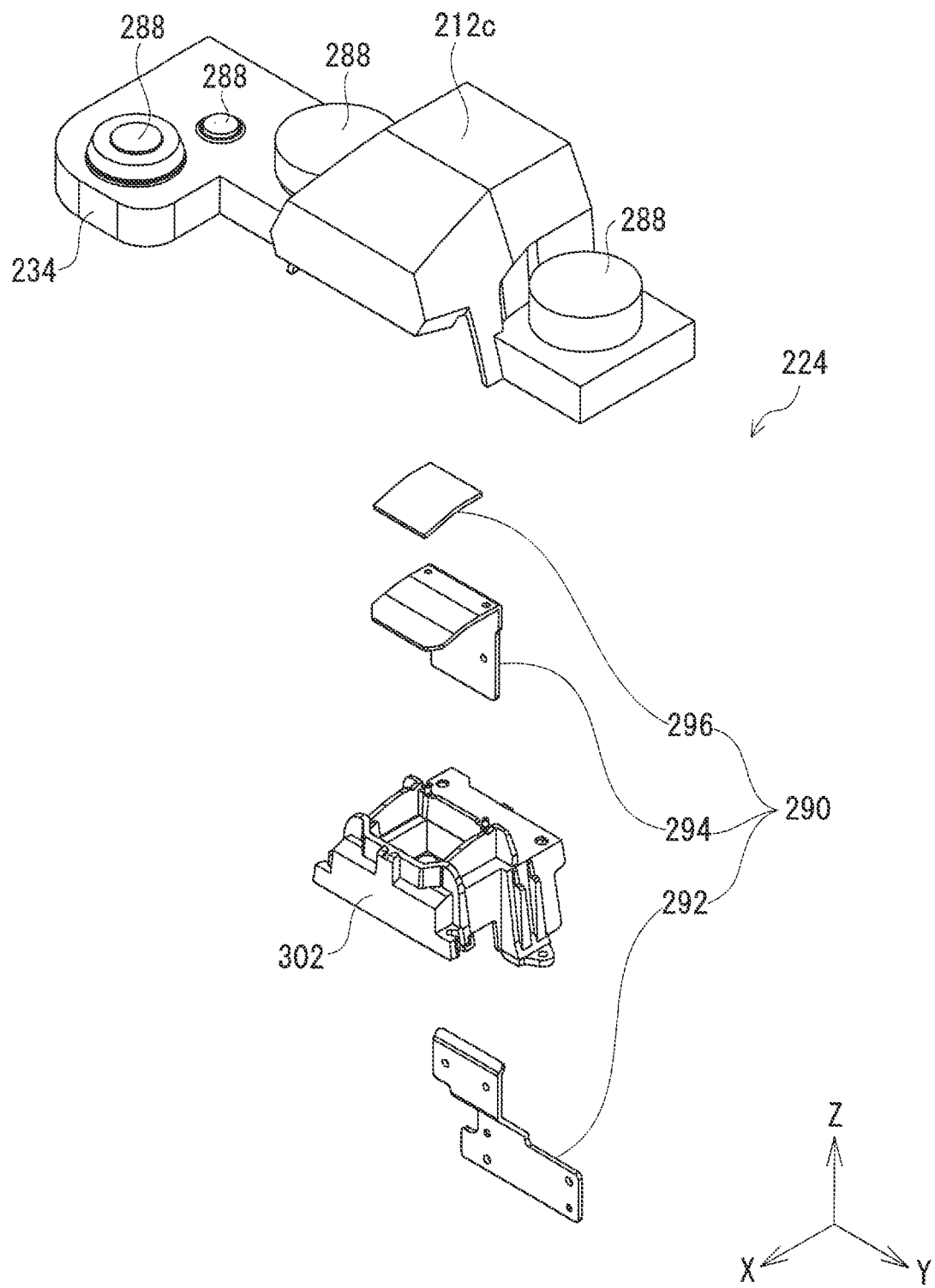
FIG. 37 is an exploded perspective view of the top unit in the second imaging apparatus according to an embodiment of the present disclosure.

FIG. 37 is an exploded perspective view of the top unit in the second imaging apparatus according to an embodiment of the present disclosure.

As shown in FIG. 37, the top unit 224 includes a plurality of operation buttons such as a shutter button 288, and a cooling module 290, in addition to the top casing 234. The operation button is electrically connected to the main circuit board 244.

The cooling module 290 is a module that forcibly cools the IC chip 284 on the main circuit board 244, and is stored in the upward protruding portion 212c of the casing 212, That is, unlike the cooling module 90 of the first imaging apparatus 10, the image sensor 254 is not forcibly cooled. It should be noted that the cooling module 290 is stored in the upward protruding portion 212c together with the electronic viewfinder 216, and is disposed in front of the electronic viewfinder 216.

Figure 38:
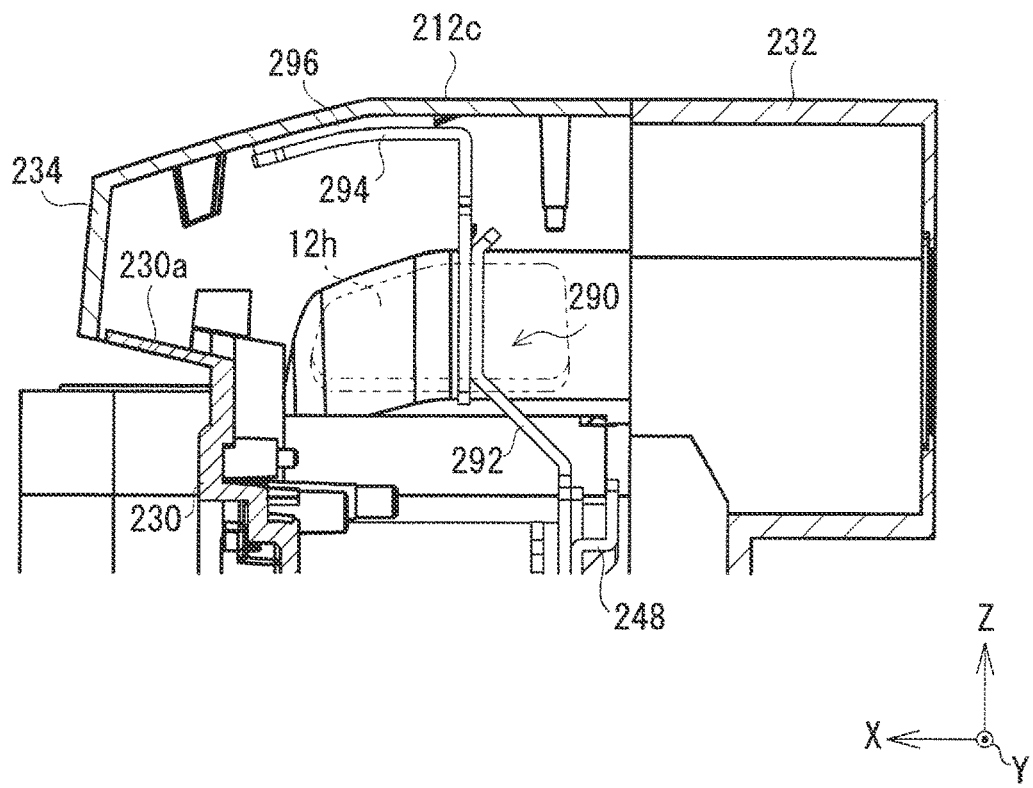
FIG. 38 is a partial cross-sectional view showing a cooling module in the upward protruding portion in the second imaging apparatus according to an embodiment of the present disclosure.

FIG. 38 is a partial cross-sectional view showing a cooling module in the upward protruding portion in the second imaging apparatus according to an embodiment of the present disclosure. In addition, FIG. 39 is a rear perspective view showing connection between the cooling module and the object to be cooled in the second imaging apparatus according to an embodiment of the present disclosure.

Figure 39:
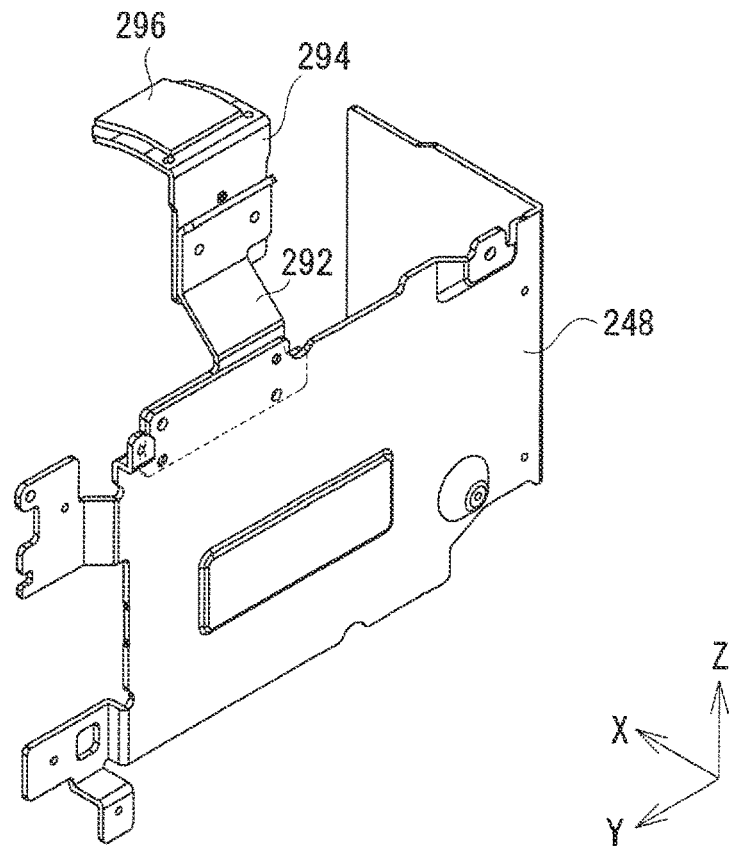
FIG. 39 is a rear perspective view showing connection between the cooling module and the object to be cooled in the second imaging apparatus according to an embodiment of the present disclosure.

As shown in FIGS. 37, 38, and 39, the cooling module 290 in the second imaging apparatus 210 is greatly different from the cooling module 90 in the first imaging apparatus 10 shown in FIGS. 12, 13, and 14.

Specifically, the cooling module 290 of the second imaging apparatus 210 includes a first heat transfer member 292 connected to the heat transfer plate 248, a second heat transfer member 294 connecting the first heat transfer member 292 and the top casing 234, and a heat transfer sheet 296 disposed between the second heat transfer member 294 and the top casing 234 and transferring heat from the second heat transfer member 294 to the top casing 234. Specifically, the second heat transfer member 294 is in contact with the inner surface of the upward protruding portion 212c with interposition of the heat transfer sheet 296. Therefore, the heat of the heat transfer plate 248 transfers to the top casing 234 through the first heat transfer member 292, the second heat transfer member 294, and the heat transfer sheet 296. Then, the heat is released from the top casing 234 to the outside. Therefore, the top casing 234 functions as a heat sink. To that end, the top casing 234 is made of a material excellent in thermal conductivity, such as a magnesium alloy. Similarly, the first and second heat transfer members 292 and 204 are also made of a material excellent in thermal conductivity, such as aluminum. It should be noted that the first heat transfer member 292 and the second heat transfer member 294 may be integrated as one component.

The movable frame 258 that absorbs heat of the image sensor 254 is not directly connected to the cooling module 290. The movable frame 258 is connected to the rear frame 262 through a heat conductive sheet 298 shown in FIG. 35 in a heat-transferable manner. It should be noted that the circuit board 256 is also connected to the rear frame 262 through a heat conductive sheet 300 in a heat-transferable manner. As shown in FIG. 34, the heat of the rear frame 262 is radiated toward the heat transfer plate 248 positioned behind the rear frame 262. That is, the heat of the rear frame 262 transfers to the cooling module 290 through the heat transfer plate 248. It should be noted that the rear frame 262 and the heat transfer plate 248 may be thermally connected through a heat conductive sheet, and the heat of the rear frame 262 may be transferred to the heat transfer plate 248 through the heat conductive sheet.

It should be noted that as shown in FIG. 38, the cooling module 290 does not require a large arrangement space in the upward protruding portion 212c. Therefore, as shown in FIG. 37, another module 302 such as a gyro sensor module that detects acceleration or angular velocity of the second imaging apparatus 210 or the like is arranged in a vacant space in the upward protruding portion 212c.

So far, the configuration of each of the first and second imaging apparatuses 10 and 210 in the imaging apparatus system according to an embodiment of the present disclosure has been described. Hereinafter, features of the imaging apparatus system including the first and second imaging apparatuses 10 and 210 will be described.

The first imaging apparatus 10 and the second imaging apparatus 210 are of different types, so that the lens mounts and the image sensors are different. Specifically, the lens mount 14 (first lens mount) of the first imaging apparatus 10 and the lens mount 214 (second lens mount) of the second imaging apparatus 210 are different in size, and therefore have different standards for lens that can be mounted. For example, the lens mount 14 of the first imaging apparatus 10 can be mounted with a lens of a standard referred to as "full size", and the lens mount 214 of the second imaging apparatus 210 can be mounted with a lens of a standard referred to as "Micro Four Thirds". In the case of the present embodiment, the mount diameter of the lens mount 14 of the first imaging apparatus 10 is larger than the mount diameter of the lens mount 214 of the second imaging apparatus 210.

In addition, as shown in FIGS. 9 and 35, the image sensor 54 (first image sensor) of the first imaging apparatus 10 and the image sensor 254 (second image sensor) of the second imaging apparatus 210 have different sizes of the light receiving surfaces 54a and 254a capable of receiving light. In the case of the present embodiment, the size of the light receiving surface 54a of the image sensor 54 of the first imaging apparatus 10 is larger than the size of the light receiving surface 254a of the image sensor 254 of the second imaging apparatus 210. It should be noted that the light receiving surfaces 54a and 254a have rectangular shapes, and the aspect ratio between the dimension in the left-right direction (Y-axis direction) and the dimension in the height direction (Z-axis direction) is substantially the same.

As described above, the first imaging apparatus 10 and the second imaging apparatus 210 are different in terms of the lens mount and the image sensor. On the other hand, as shown in FIGS. 1 to 5 and FIGS. 27 to 31, the first imaging apparatus 10 and the second imaging apparatus 210 have designability similar to that of a single-lens reflex type camera in appearance. That is, the first and second imaging apparatuses 10 and 210 have design features similar to the design features of the single-lens reflex type camera, and thus are similar to each other in appearance.

Figure 4:
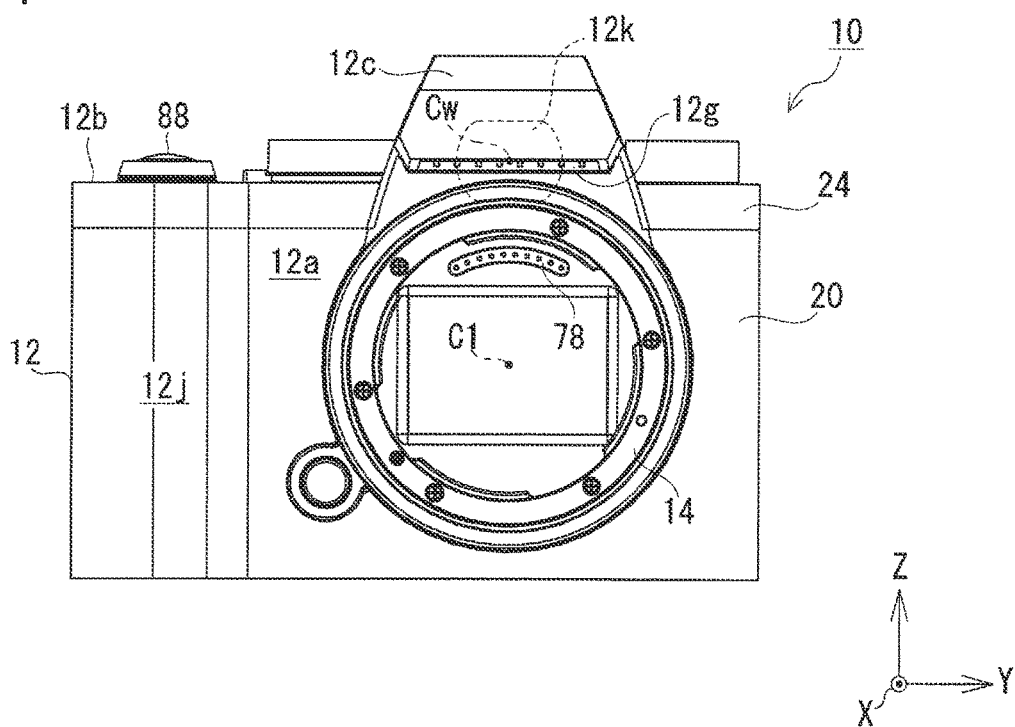
FIG. 4 is a front view of the first imaging apparatus according to an embodiment of the present disclosure.
Figure 30:
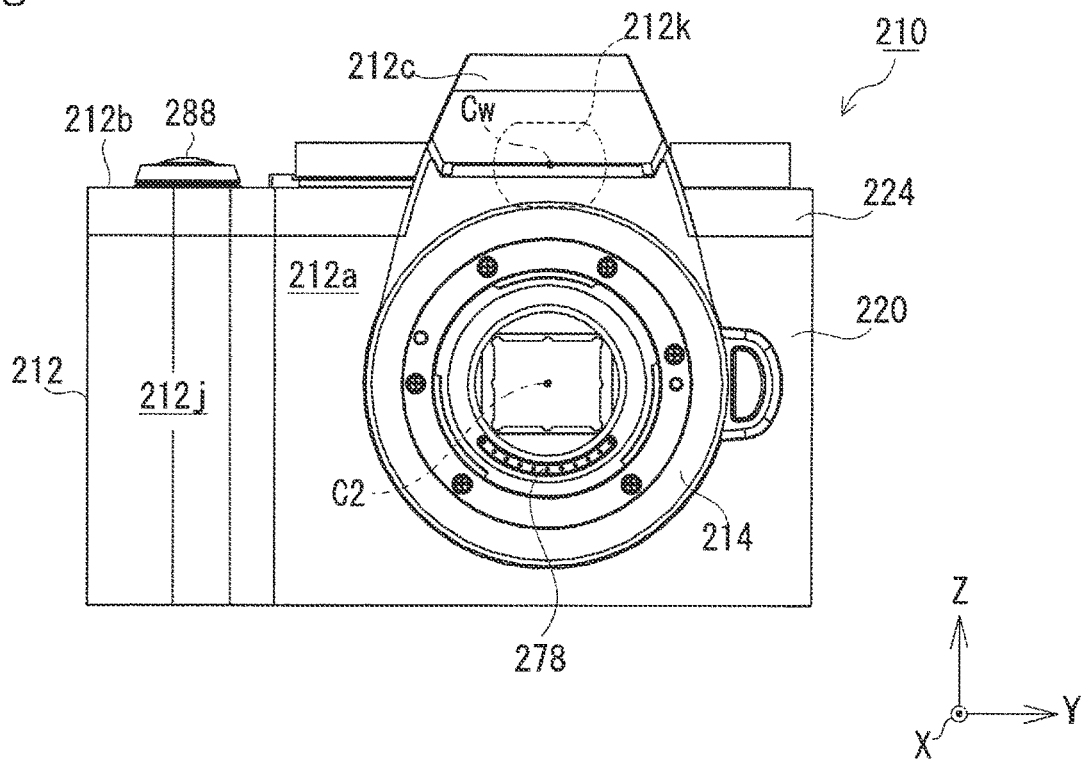
FIG. 30 is a front view of the second imaging apparatus according to an embodiment of the present disclosure.

Specifically, as design features of the single-lens reflex type camera, as shown in FIGS. 4 and 30, in the first and second imaging apparatuses 10 and 210, grip portions 12j and 212j are integrally provided in portions of the casings 12 and 212 on the left sides of the lens mounts 14 and 214 in a front view. The grip portions 12j and 212j are gripped by the user's right hand. Shutter buttons 88 and 288 are disposed in portions on the top surfaces 12b and 212b positioned above the grip portions 12j and 212j. That is, the user can depress the shutter button with the right hand while gripping the grip portion with the right hand. In the case of the present embodiment, the grip portions 12j and 212j are respectively provided in the front casings 30 and 230, and have substantially the same shape, that is, are common in shape. Unlike this, the shapes of the grip portions 12j and 212j may be different.

In addition, as design features similar to the design features included in some types of single-lens reflex type cameras, as shown in FIGS. 4 and 30, the first and second imaging apparatuses 10 and 210 include upward protruding portions 12c and 212c protruding upward from the top surfaces 12b and 212b. The upward protruding portions 12c and 212c are features of a single-lens reflex type camera including a pentamirror. In the case of a single-lens reflex type camera including a pentamirror, the pentamirror is stored in the upward protruding portion, and a finder window is provided on the rear surface of the upward protruding portion. It should be noted that the first and second imaging apparatuses 10 and 210 according to the present embodiment do not include the pentamirrors as described above.

Furthermore, as shown in FIGS. 3 and 29, the first and second imaging apparatuses 10 and 210 include monitors 18 and 218 on the rear surfaces 12f and 212f, as features similar to the features of a camera that is digital and includes an upward protruding portion.

In many types of single-lens reflex type cameras, the finder window is positioned above the center of the lens mount (that is, the optical axis of the lens to be mounted on the lens mount) as viewed in the front-rear direction (X-axis direction). In addition, the position in the left-right direction (Y-axis direction) of the center of the lens mount and the position in the left-right direction of the center of the finder window are the same. As shown in FIGS. 4 and 30, in the first and second imaging apparatuses 10 and 210, the centers Cw of the finder windows 12k and 212k are the same as the centers of the lens mounts 14 and 214 (that is, the optical axes C1 and C2) in terms of the positions in the left-right direction, but are different from the centers of the lens mounts in terms of the positions in the height direction (Z-axis direction) and are positioned above the centers of the lens mounts 14 and 214. It should be noted that in the case of the present embodiment, in order to have design features similar to the design features of the single-lens reflex type camera, the finder windows 12k and 212k are provided on the rear surfaces of the upward protruding portions 12c and 212c in the rear casings 32 and 232. However, since a single-lens reflex type camera in which the finder window is not provided in the upward protruding portion is also present, the embodiment of the present disclosure does not limit a portion where the finder window is provided.

Figure 31:
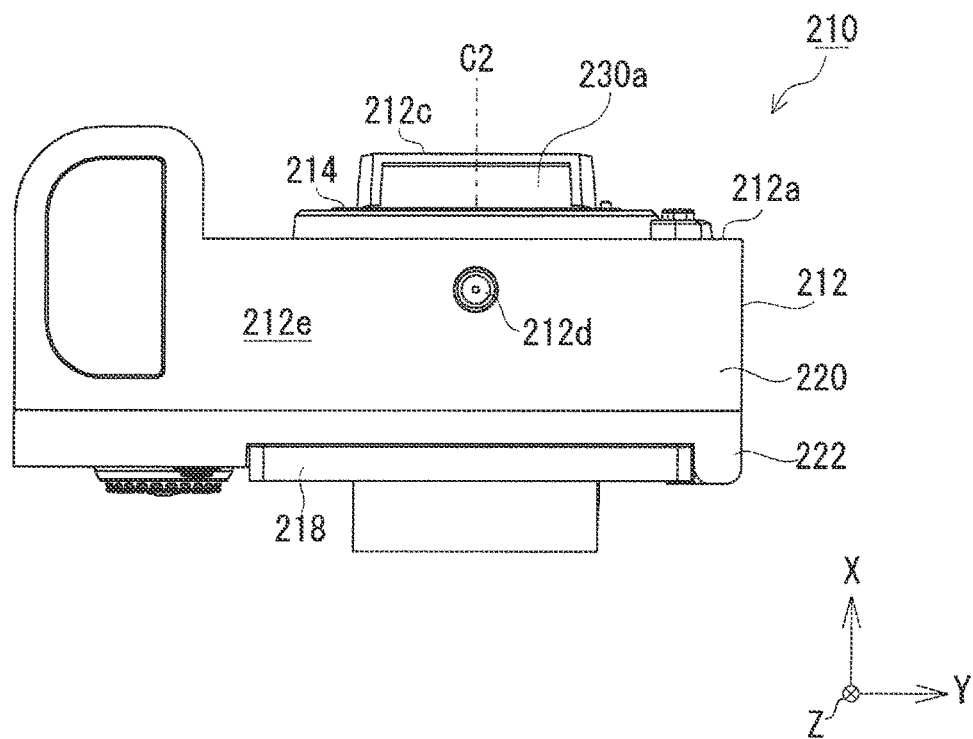
FIG. 31 is a bottom view of the second imaging apparatus according to an embodiment of the present disclosure.

As a further feature, many types of single-lens reflex type cameras include female screw holes for mounting camera platforms on the casing bottom surfaces. In most cases, the female screw hole is a female screw hole with which a ¼ inch size male screw engages. Specifically, the position in the left-right direction of the center of the lens mount (that is, the optical axis of the lens to be mounted on the lens mount) is the same as the position in the left-right direction of the female screw hole. As shown in FIGS. 5 and 31, in the first and second imaging apparatuses 10 and 210, in a bottom view, the female screw holes 12d and 212d are positioned on the optical axes C1 and C2 of the lenses to be mounted on the lens mounts 14 and 214. In other words, the positions in the left-right direction (Y-axis direction) of the centers (that is, the optical axes C1 and C2) of the lens mounts 14 and 214 are the same as the positions in the left-right direction of the female screw holes 12d and 212d.

As described above, even when the lens mount, the image sensor, and the like are different, since the first and second imaging apparatuses 10 and 210 have similar designability to a single-lens reflex type camera, the inventor has found that it is possible to commonize many components of the first and second imaging apparatuses 10 and 210. Thus, in producing the first and second imaging apparatuses 10 and 210 having different lens mounts, image sensors, and the like, an imaging apparatus system for communizing a part has been considered.

Figure 40:
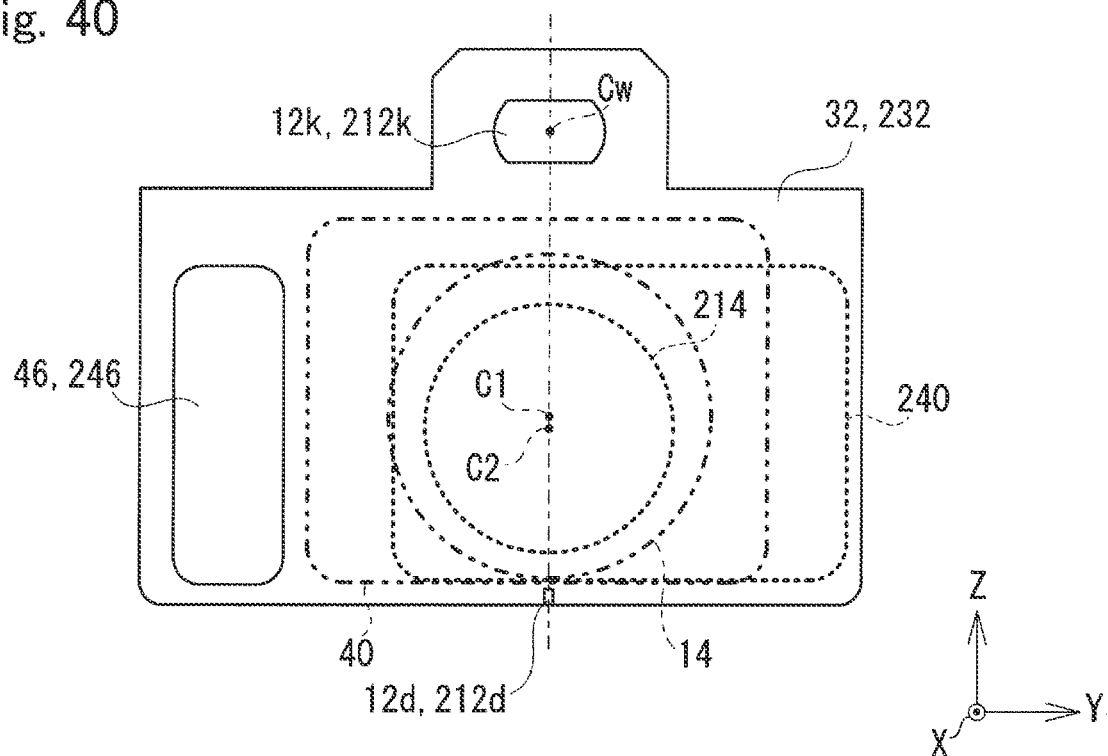
FIG. 40 is a conceptual diagram of an imaging apparatus system according to an embodiment of the present disclosure.

FIG. 40 is a conceptual diagram of an imaging apparatus system according to an embodiment of the present disclosure.

As shown in FIG. 40, the inventor has considered communizing the rear casing and the top casing as partially commonizing the first imaging apparatus 10 and the second imaging apparatus 210. It should be noted that the commonization referred to herein is communization of shapes, and colors, materials, painting, printing, and the like may be different. In the case of the present embodiment, specifically, the rear casing is commonized as a whole, and the top casing is partially commonized. Therefore, the rear casing 32 of the first imaging apparatus 10 shown in FIG. 6 and the rear casing 232 of the second imaging apparatus 210 shown in FIG. 32 are the same. In addition, the top casing 34 of the first imaging apparatus 10 shown in FIG. 6 and the top casing 234 of the second imaging apparatus 210 shown in FIG. 32 are communized except for the presence or absence of the exhaust ports 12h and 12i.

With the commonization of the rear casing, components that need to be provided in the rear casing and components enabled to be provided in the rear casing are commonized. First, as shown in FIGS. 3 and 29, the monitors 18 and 218 and the operation buttons 86 and 286 provided on the rear surfaces 12f and 212f of the rear casings 32 and 232 are commonized.

In the case of the present embodiment, as shown in FIGS. 6 and 32, in the first and second imaging apparatuses 10 and 210, the electronic viewfinders 16 and 216 are commonized and are provided in the commonized rear casings 32 and 232. Specifically, in the case of the present embodiment, the rear casings 32 and 232 include rear side portions of the upward protruding portions 12c and 212c, and commonized electronic viewfinders 16 and 216 are provided inside them, That is, in the case of the present embodiment, the entire rear units 22 and 222 of the first and second imaging apparatuses 10 and 210 are commonized. It should be noted that as described above, the rear units 22 and 222 may be commonized throughout, or some components such as the rear casings 32 and 232 and the monitors 18 and 218 included in the rear units 22 and 222 may be commonized. When the electronic viewfinder is not commonized, the electronic viewfinder may be provided in the rear casing or may be provided in a casing other than the rear casing.

In addition, in the case of the present embodiment, the top unit 24 of the first imaging apparatus 10 and the top unit 224 of the second imaging apparatus 110 are commonized except for the presence or absence of the exhaust ports 12h and 12i in the top casings 34 and 234 and the difference between the cooling modules 90 and 290. That is, the plurality of operation buttons such as the shutter button 288 provided in the top casings 34 and 234 are commonized.

Due to the commonization between the rear casing 32 and the top casing 34 of the first imaging apparatus 10 and the rear casing 232 and the top casing 234 of the second imaging apparatus 210 (in the case of the present embodiment, commonization of the rear units 22 and 222, and partial commonization of the top units 24 and 224), the design, and the development cost of components, of the first and second imaging apparatuses 10 and 210 can be streamlined. That is, in the case of the present embodiment, development (component design or the like) of the front unit suited for the commonized rear unit and the partially commonized top unit only needs to be performed.

It should be noted that when the first and second imaging apparatuses 10 and 210 have specifications in which accessories can be attached to the rear casings 32 and 232 and the top casings 34 and 234, the accessories can be commonly used for the first and second imaging apparatuses 10 and 210. For example, the user possessing the first and second imaging apparatuses 10 and 210 does not need to prepare accessories for each of the imaging apparatuses.

Naturally, it is necessary to consider lens mounts 14 and 214 different from each other in designing a common rear casing.

First, in the first imaging apparatus 10, the center of the lens mount 14 and the center of the light receiving surface 54a of the image sensor 54 are positioned on the optical axis C1, that is, the position in the left-right direction (Y axis direction) and the position in the height direction (Z-axis direction) are the same. In addition, in the second imaging apparatus 210, the center of the lens mount 214 and the center of the light receiving surface 254a of the image sensor 254 are positioned on the optical axis C2, that is, the position in the left-right direction and the position in the height direction are the same.

Thus, as shown in FIG. 40, the first and second imaging apparatuses 10 and 210 are designed (produced) so that the optical axis C1 of the first imaging apparatus 10 and the optical axis C2 of the second imaging apparatus 210 are substantially the same, regarding the relative position in the left-right direction (Y-axis direction) with respect to the commonized rear casings 32 and 232. That is, when each of the front casings 30 and 230 is attached to the commonized rear casing, the center of the lens mount 14 of the front casing 30 and the center of the lens mount 214 of the front casing 230 are substantially the same, regarding the relative position in the left-right direction with respect to the commonized rear casing. With this constraint, the design of each of the first and second imaging apparatuses 10 and 210 can be streamlined.

Specifically, in the case of the present embodiment, the commonized rear casings 32 and 232 include most of the rear surfaces 12f and 212f of the casings 12 and 212 of the first and second imaging apparatuses 10 and 210. Therefore, the dimensions in the left-right direction (Y-axis direction) of the commonized rear casings 32 and 232 substantially coincide with the dimensions in the left-right direction of the first and second imaging apparatuses 10 and 210. As a result, as shown in FIG. 40, as viewed in the front-rear direction (X-axis direction), the imaging module 40 of the first imaging apparatus 10 and the imaging module 240 of the second imaging apparatus 210 are present at substantially the same position in the outline shapes of the commonized rear casings 32 and 232.

Here, regarding the relative position in the left-right direction (Y-axis direction) with respect to the commonized rear casings 32 and 232, when the center of the lens mount 14 of the front casing 30 (that is, the optical axis C1) and the center of the lens mount 214 of the front casing 230 (that is, the optical axis C2) are greatly different, as a result, it is necessary to increase the dimensions in the left-right direction of the first and second imaging apparatuses 10 and 210.

Specifically, regarding the relative position in the left-right direction (Y-axis direction) with respect to the commonized rear casings 32 and 232, when the center of the lens mount 14 of the front casing 30 (that is, the optical axis C1) and the center of the lens mount 214 of the front casing 230 (that is, the optical axis C2) are greatly different, the relative positions in the left-right direction of the centers of the respective light receiving surfaces 54a and 254a of the image sensors 54 and 254 with respect to the commonized front casings 32 and 232 are also greatly different. In addition, for this reason, the relative positions in the left-right direction of the respective imaging modules 40 and 240 including the image sensors 54 and 254 are also greatly different.

In order for the imaging modules 40 and 240 having greatly different relative positions in the left-right direction (Y-axis direction) to be present within the outline shapes of the rear casings 32 and 232 commonized as viewed in the front-rear direction (X-axis direction), it is necessary to increase the dimensions in the left-right direction of the commonized rear casings. As a result, it is necessary to increase the dimensions in the left-right direction of the first and second imaging apparatuses 10 and 210 adopting the commonized rear casings.

However, in order to secure the designability of the imaging apparatus similar to the single-lens reflex type camera, it is limited to increase the dimensions in the left-right direction of the first and second imaging apparatuses 10 and 210. As a result, it may be difficult to design the first and second imaging apparatuses 10 and 210 despite the rear casings being commonized.

Thus, in the case of the present embodiment, the first and second imaging apparatuses 10 and 210 are designed so that when the respective front casings 30 and 230 are attached to the commonized rear casings 32 and 232, the center of the lens mount 14 of the front casing 30 and the center of the lens mount 214 of the front casing 230 are substantially the same, regarding the relative positions in the left-right direction (Y-axis direction) with respect to the commonized rear casings.

It should be noted that in the case of the present embodiment, as shown in FIG. 40, the optical axis C1 of the first imaging apparatus 10 and the optical axis C2 of the second imaging apparatus 210 are different regarding the relative positions in the height direction (Z-axis direction) with respect to the commonized rear casings 32 and 232. That is, when the respective front casings 30 and 230 are attached to the commonized rear casings, the center of the lens mount 14 of the front casing 30 (that is, the optical axis C1) and the center of the lens mount 214 of the front casing 230 (that is, the optical axis C2) are different, regarding the relative positions in the height direction with respect to the commonized rear casings.

When each of the imaging apparatuses 10 and 210 is viewed alone, the relative positions in the height direction (Z-axis direction) of the lens mounts 14 and 214, the female screw holes 12d and 212d, and the finder windows 12k and 212k with respect to the upward protruding portions 12c and 212c do not greatly affect the design as compared with the relative positions in the left-right direction (Y-axis direction), Therefore, regarding the relative positions in the height direction with respect to the commonized rear casings 32 and 232, the center of the lens mount 14 of the front casing 30 and the center of the lens mount 214 of the front casing 230 may be freely set to some extent, but are desirably the same as much as possible.

In addition, in the case of the present embodiment, as shown in FIG. 40, when the front casings 30 and 230 are respectively attached to the commonized rear casings 32 and 232, as shown in FIG. 40, the centers Cw of the finder windows 12k and 212k of the commonized rear casings 32 and 232 and the centers of the lens mounts 14 and 214 (that is, the optical axes C1 and C2) are the same, regarding the positions in the left-right direction (Y-axis direction), Accordingly, the first and second imaging apparatuses 10 and 210 are similar to many types of single-lens reflex cameras.

It should be noted that in the case of the present embodiment, the female screw holes 12d and 212d for being mounted on the camera platform are provided in the front casings 30 and 230 of the front units 20 and 220. In place of this, the commonized rear casings 32 and 232 of the commonized rear units 22 and 222 may be provided with female screw holes 12d and 212d. In this case, the rear casings 32 and 232 include at least a part of the bottom surfaces 12e and 212e of the casings 12 and 212. In addition, when the front casings 30 and 230 are respectively attached to the commonized rear casings 32 and 232, as shown in FIG. 40, regarding the positions in the left-right direction (Y-axis direction), the centers of the female screw holes 12d and 212d of the commonized rear casings 32 and 232 and the centers of the lens mounts 14 and 214 (that is, the optical axes C1 and C2) are desirably the same as much as possible. Accordingly, the first and second imaging apparatuses 10 and 210 are similar to many types of single-lens reflex cameras.

The rear casing 32 of the first imaging apparatus 10 and the rear casing 232 of the second imaging apparatus 210 are commonized, but the front casing 30 of the first imaging apparatus 10 and the front casing 230 of the second imaging apparatus 210 are not commonized. This is because different lens mounts 14 and 214 are respectively attached to the front casings 30 and 230.

It should be noted that, in the case of the present embodiment, the image sensor 54 of the first imaging apparatus 10 and the image sensor 254 of the second imaging apparatus 210 are different, and therefore the imaging modules 40 and 240 are also different. Then, the imaging modules 40 and 240 are provided in the front casings 30 and 230. In place of this, the image sensor 54 of the first imaging apparatus 10 and the image sensor 254 of the second imaging apparatus 210 may be the same, so that the imaging modules 40 and 240 may also be the same.

When the imaging modules 40 and 240 are the same, that is, commonized, they may be provided in the commonized rear casings 32 and 232, that is, may be incorporated in the commonized rear units 22 and 222.

In other words, in the case of the present embodiment, the lens mounts 14 and 214 and the image sensors 54 and 254 are provided in the front casings 30 and 230 in a state where the centers of the lens mounts 14 and 214 and the centers of the image sensors 54 and 254 overlap in the front-rear direction (X-axis direction), Therefore, there is no need to attach the front casings 30 and 230 and the commonized rear casings 32 and 232 to each other with high positioning accuracy. As a result, there is no need to produce the rear casings 32 and 232, that is, the rear units 22 and 222 with high accuracy.

In the case of the present embodiment, the rear units 22 and 222 of the first and second imaging apparatuses 10 and 210 are commonized, and the front units 20 and 220 are not commonized. In the case of the present embodiment, the remaining top units 24 and 224 are commonized except for a part thereof.

As shown in FIGS. 12 and 37, the cooling module 90 provided in the top unit 24 of the first imaging apparatus 10 is completely different from the cooling module 290 provided in the top unit 224 of the second imaging apparatus 210, However, many parts of the top casings 34 and 234 are commonized.

Figure 41:
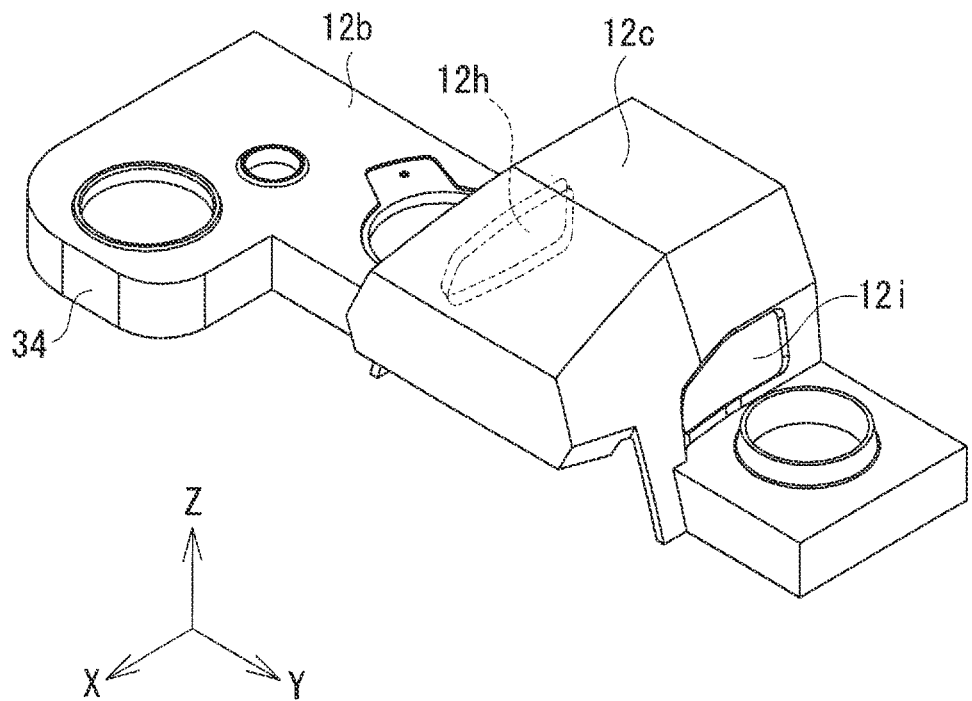
FIG. 41 is a perspective view of a top casing in the first imaging apparatus according to an embodiment of the present disclosure.

FIG. 41 is a perspective view of a top casing in the first imaging apparatus according to an embodiment of the present disclosure. In addition, FIG. 42 is a perspective view of a top casing in the second imaging apparatus according to an embodiment of the present disclosure.

Figure 42:
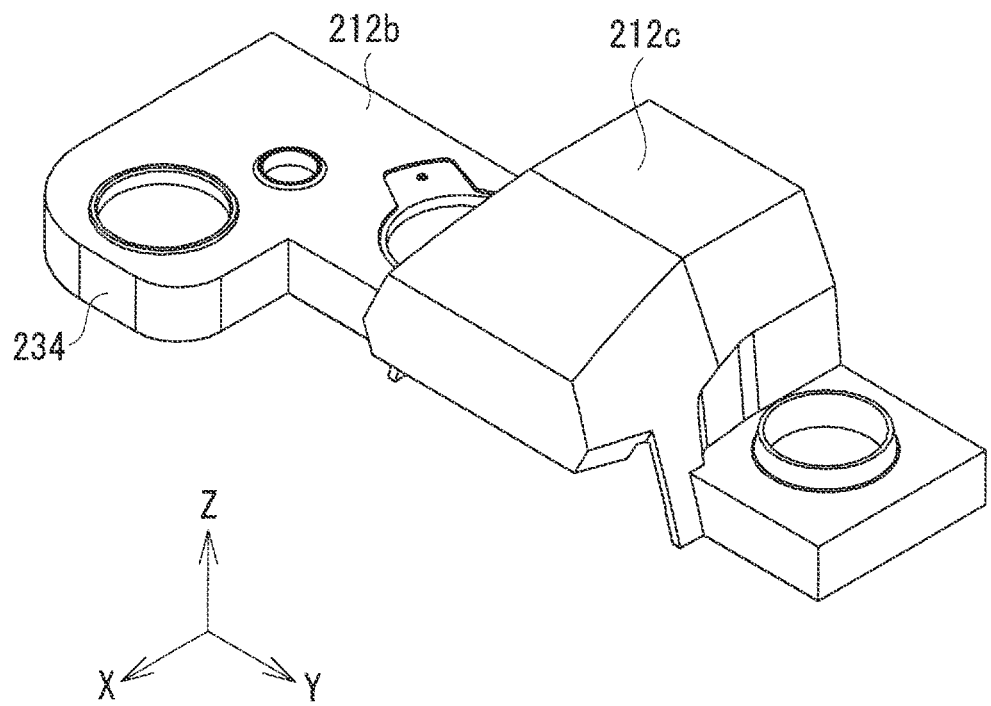
FIG. 42 is a perspective view of a top casing in the second imaging apparatus according to an embodiment of the present disclosure.

As shown in FIGS. 41 and 42, the top casing 34 of the first imaging apparatus 10 and the top casing 234 of the second imaging apparatus 210 are the same except that the former includes vent holes 12h and 12i. That is, the top casing 34 of the first imaging apparatus 10 has a shape in which the vent holes 12h and 12i are formed in the top casing 234 of the second imaging apparatus 210, It should be noted that, for reference, a portion where the vent hole 12h is formed is indicated by a two-dot chain line in FIG. 38.

In the case of the present embodiment, the vent holes 12*h* and 12*i* are formed on both respective sides in the left-right direction (Y-axis direction) of the upward protruding portion 12*c*. In addition, as described above and shown in FIG. 15, the vent holes 12*h* and 12*i* are exhaust ports through which the air flow F generated by the fan 98 of the cooling module 90 passes.

The top casing 34 of the first imaging apparatus 10 is produced by producing the top casing 234 of the second imaging apparatus 210 with a mold and then forming the vent holes 12*h* and 12*i* in the molded top casing 234. That is, the top casings 34 and 234 are common except for the presence or absence of the vent holes 12*h* and 12*i*, FIG. 43 is a diagram showing an example of a method for forming the vent hole of the top casing in the first imaging apparatus according to an embodiment of the present disclosure.

Figure 43:
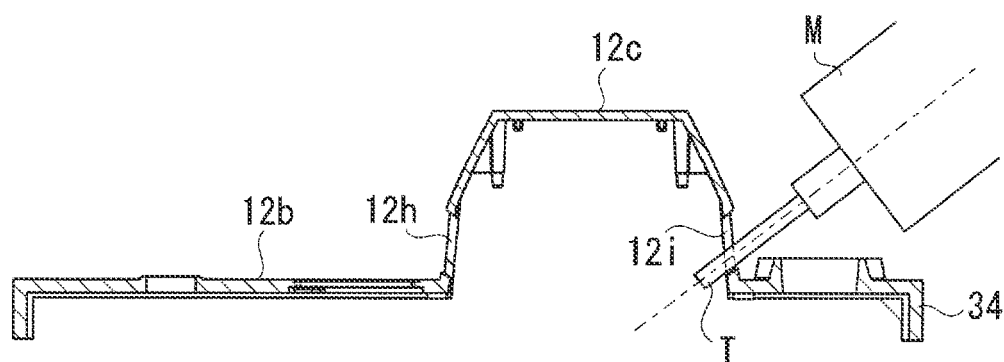
FIG. 43 is a diagram showing an example of a method for forming the vent hole of the top casing in the first imaging apparatus according to an embodiment of the present disclosure.

As shown in FIG. 43, the vent holes 12*h* and 12*i* of the top casing 34 are produced by cutting work. The vent holes 12*h* and 12*i* are formed by a cutting tool T such as an end mill. It should be noted that the vent holes 12*h* and 12*i* are formed obliquely with respect to the respective side surfaces on both sides in the left-right direction (Y-axis direction) of the upward protruding portion 12*c* so that the head M of the machining center that holds the cutting tool T does not interfere with the top casing 34.

It should be noted that as described above, since the top casing 234 of the second imaging apparatus 210 functions as a heat sink, the top casing 234 is made of, for example, a magnesium alloy having excellent thermal conductivity. Since the magnesium alloy is easily subjected to cutting work, the top casing 34 of the first imaging apparatus 10 including the vent holes 12*h* and 12*i* can be produced by cutting work from the top casing 234 of the second imaging apparatus 210 having no vent hole.

In addition, it is also possible to produce the top casing 234 of the second imaging apparatus 210 by closing the vent holes 12*h* and 12*i* of the top casing 34 of the first imaging apparatus 10. That is, the top casing 234 has a shape in which the vent hole of the top casing 34 is closed. In this case, for example, first, the top casing 34 is produced with a mold, and the top casing 234 is produced by filling the vent holes 12*h* and 12*i* of the top casing 34 with a lid member.

Furthermore, except for the presence or absence of the vent holes 12*h* and 12*i*, the top casing 34 of the first imaging apparatus 10 and the top casing 234 of the second imaging apparatus 210 are the same. Therefore, a vent hole such as a vent hole 12*g* (in the case of the present embodiment, an intake port) formed by the top casing 34 and the front casing 30 of the first imaging apparatus 10 shown in FIG. 14 is also formed in the second imaging apparatus 210. In order to close the vent hole, as shown in FIG. 38, the front casing 230 of the second imaging apparatus 210 is provided with a protruding portion 230*a* functioning as a lid.

According to the present embodiment as described above, in producing a plurality of imaging apparatuses of different types, the design thereof can be streamlined, and the manufacturing cost can be suppressed low.

Specifically, by using the fact that the plurality of imaging apparatuses have similar designability to the single-lens reflex type camera to commonize some, the design of the plurality of imaging apparatuses can be streamlined, and the manufacturing cost of the plurality of imaging apparatuses can be suppressed low.

In addition, it is also possible to selectively use the lens mount depending on the subject, imaging conditions, and the like, that is, for a user who selectively uses a plurality of imaging apparatuses to use a common operation system, and thus, usability is improved.

It should be noted that when the first and second imaging apparatuses have specifications in which accessories can be attached to the rear casings and the top casings, the accessories can be commonly used for the first and second imaging apparatuses. For example, the user possessing the first and second imaging apparatuses does not need to prepare accessories for each of the imaging apparatuses.

As described above, although the embodiments of the present disclosure have been described by exemplifying the above-described embodiments, the embodiments of the present disclosure are not limited to the above-described embodiments.

In the case of the above-described embodiment, the lens mount 14 of the first imaging apparatus 10 is different from the lens mount 214 of the second imaging apparatus 210, but the embodiment of the present disclosure is not limited thereto. The lens mount of the first imaging apparatus and the lens mount of the second imaging apparatus may be the same.

In addition, in the case of the above-described embodiment, as shown in FIGS. 3 and 29, in the first and second imaging apparatuses 10 and 210, the monitors 18 and 218 are provided in the rear units 22 and 222. However, the embodiment of the present disclosure is not limited thereto. The monitors 18 and 218 may be attachable to and detachable from the rear units 22 and 222. That is, the first and second imaging apparatuses according to the embodiments of the present disclosure do not need to include monitors.

That is, in a broad sense, an imaging apparatus system according to an embodiment of the present disclosure is an imaging apparatus system including: a first imaging apparatus: and a second imaging apparatus. The first imaging apparatus includes: a first top casing including a casing top surface, and a common rear casing including a casing rear surface. The second imaging apparatus includes: a second top casing including a casing top surface, and the common rear casing. The first top casing has a shape in which a vent hole is formed in the second top casing.

As described above, the above-described embodiments have been described as the exemplification of the technique in the present disclosure. To that end, drawings and a detailed description are provided. Therefore, among the components described in the drawings and the detailed description, not only the components essential for solving the problem, but also the components not essential for solving the problem may be included in order to exemplify the above technique. Therefore, it should not be recognized that these non-essential components are essential immediately because these non-essential components are described in the drawings and the detailed description.

In addition, since the above embodiments are for exemplifying the technique in the present disclosure, various changes, substitutions, additions, omissions, and the like can be made within the scope of the claims or the equivalent thereof.

The present disclosure is applicable to a plurality of different imaging apparatuses having similar designability.

What is claimed is:

1. An imaging apparatus system comprising:
   a first imaging apparatus; and
   a second imaging apparatus, wherein the first imaging apparatus includes
a first top casing including a casing top surface, and
a common rear casing including a casing rear surface,
the second imaging apparatus includes
a second top casing including a casing top surface, and
the common rear casing, and
the first top casing has a shape in which a vent hole is formed in the second top casing.

2. The imaging apparatus system according to claim 1, wherein
the second top casing includes an upward protruding portion protruding upward, and
the first top casing has a shape in which the vent hole is formed on both respective sides in a left-right direction of the upward protruding portion of the second top casing.

3. The imaging apparatus system according to claim 2, wherein
the first imaging apparatus includes a first coding module to be disposed in the upward protruding portion, and
the first coding module includes
a fan configured to generate an air flow passing through the vent hole of the first top casing, and
a heat sink to be coded by air blown from the fan.

4. The imaging apparatus system according to claim 3, wherein
the first imaging apparatus includes
a first image sensor, and
a first circuit board, and
the first image sensor and the first circuit board are connected to the heat sink of the first cooling module.

5. The imaging apparatus system according to claim 2, wherein
the second imaging apparatus includes a second cooling module to be disposed in the upward protruding portion, and
the second cooling module includes a heat transfer member configured to come into contact with and transfer heat to the second top casing.

6. The imaging apparatus system according to claim 5, wherein
the second imaging apparatus includes
a second image sensor, and
a second circuit board, and
the second circuit board is connected to the heat transfer member of the second cooling module.

7. The imaging apparatus system according to claim 1, wherein
the first imaging apparatus includes
a first front casing including a casing front surface, and
a first lens mount attached to the first front casing, and
the second imaging apparatus includes
a second front casing including a casing front surface, and
a second lens mount attached to the second front casing and different from the first lens mount.

8. The imaging apparatus system according to claim 1, wherein each of the first and second imaging apparatuses includes a common monitor attached to the common rear casing.

* * * * *